(12) United States Patent
Glickman et al.

(10) Patent No.: US 10,821,877 B2
(45) Date of Patent: Nov. 3, 2020

(54) LOOSE LAYERED BUILD COMPONENTS AND VEHICLE FRONT END ASSEMBLY STRATEGY

(71) Applicant: FORD GLOBAL TECHNOLOGIES, LLC, Dearborn, MI (US)

(72) Inventors: David Brian Glickman, Southfield, MI (US); Matt W. Roosen, Memphis, MI (US); Andre Jurkiewicz, Northville, MI (US); Bradly Gilmour, Bloomfield Hills, MI (US); Sandip Patel, Canton, MI (US); Justin Carroll, New Baltimore, MI (US); Matthew William Maier, Berkley, MI (US); David Paul Villescas, Northville, MI (US); Scott Stinson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/263,900

(22) Filed: Jan. 31, 2019

(65) Prior Publication Data

US 2019/0160997 A1    May 30, 2019

Related U.S. Application Data

(63) Continuation of application No. 15/398,068, filed on Jan. 4, 2017, now Pat. No. 10,272,819.

(51) Int. Cl.
*B60Q 1/04* (2006.01)
*B60Q 1/00* (2006.01)
(Continued)

(52) U.S. Cl.
CPC ......... *B60Q 1/0466* (2013.01); *B60Q 1/0017* (2013.01); *B60Q 1/0441* (2013.01);
(Continued)

(58) Field of Classification Search
CPC .. B60Q 1/0017; B60Q 1/0441; B60Q 1/0466; B60R 19/52; B60R 2019/1886; B60R 2019/525; F21S 41/29; F21S 45/10
See application file for complete search history.

(56) References Cited

U.S. PATENT DOCUMENTS

| 4,645,250 A | 2/1987 | Bauer et al. |
| 5,331,521 A | 7/1994 | Ravier et al. |
| (Continued) |

FOREIGN PATENT DOCUMENTS

| DE | 102007052569 A1 | 5/2009 | |
| EP | 1002700 A2 * | 5/2000 | ............. B60R 19/40 |
| (Continued) |

OTHER PUBLICATIONS

English Machine Translation of DE102007052569A1 dated May 7, 2009.
(Continued)

*Primary Examiner* — Tsion Tumebo
(74) *Attorney, Agent, or Firm* — David Coppiellie; King & Schickli, PLLC

(57) ABSTRACT

A headlight assembly for assembly adjacent at least one skin component of a vehicle includes a housing supporting at least one light and a lens attached to the housing. The lens includes at least one attribute for engaging the at least one skin component. The attribute may be a pin or an aperture formed in the lens which may extend a distance from a surface of the lens for guiding the skin component. The skin component may be a grille and the attribute may restrict movement of the headlight assembly relative the grille in a Y-axis direction forming a margin therebetween. The attribute may be a channel including a bracket for guiding the skin component, for instance, a facia into the channel. The attribute may be a cavity formed in the lens for receiving an
(Continued)

overlapping portion of the skin component, for example, a grille.

8 Claims, 19 Drawing Sheets

(51) Int. Cl.
*B60R 19/52* (2006.01)
*F21S 45/10* (2018.01)
*F21S 41/29* (2018.01)
*B60R 19/18* (2006.01)

(52) U.S. Cl.
CPC .............. *B60R 19/52* (2013.01); *F21S 41/29* (2018.01); *F21S 45/10* (2018.01); *B60R 2019/1886* (2013.01); *B60R 2019/525* (2013.01)

(56) References Cited

U.S. PATENT DOCUMENTS

| | | | |
|---|---|---|---|
| 5,358,304 A | 10/1994 | Kanemitsu | |
| 5,582,475 A | 12/1996 | Yagi | |
| 5,865,500 A | 2/1999 | Sanada et al. | |
| 6,523,886 B2 | 2/2003 | Hoffner et al. | |
| 6,612,595 B1* | 9/2003 | Storer | B60R 3/00 280/163 |
| 7,014,254 B2 | 3/2006 | Rijsbergen et al. | |
| D539,709 S | 4/2007 | Woodhouse et al. | |
| 7,338,191 B2 | 3/2008 | Konno et al. | |
| 7,644,966 B2 | 1/2010 | Huber et al. | |
| 7,677,779 B2 | 3/2010 | Schwab | |
| 7,798,687 B2 | 9/2010 | Lin | |
| 7,841,651 B2 | 11/2010 | Crainic et al. | |
| 7,914,070 B2 | 3/2011 | Fayt | |
| 7,988,225 B2 | 8/2011 | Goldsberry | |
| 8,118,461 B2 | 2/2012 | Joly-Pottuz et al. | |
| 8,297,817 B2 | 10/2012 | Hashimoto et al. | |
| 8,414,069 B1 | 4/2013 | Contardi et al. | |
| 8,720,975 B1 | 5/2014 | Perez et al. | |
| 8,911,005 B2 | 12/2014 | Townson et al. | |
| 9,016,772 B2 | 4/2015 | Townson et al. | |
| D730,777 S | 6/2015 | Nurnberger | |
| 9,381,946 B2 | 7/2016 | Clapie et al. | |
| D777,070 S | 1/2017 | Nurnberger | |
| D778,790 S | 2/2017 | Nurnberger | |
| 9,821,861 B2 | 11/2017 | Murray et al. | |
| 9,896,134 B2 | 2/2018 | Tsumiyama et al. | |
| 10,272,819 B2 | 4/2019 | Glickman et al. | |
| 2004/0156208 A1 | 8/2004 | Ito | |
| 2004/0160784 A1 | 8/2004 | Park | |
| 2004/0264203 A1 | 12/2004 | Konno | |
| 2006/0227565 A1 | 10/2006 | Nantais et al. | |
| 2006/0249987 A1 | 11/2006 | Knoll | |
| 2006/0283015 A1 | 12/2006 | Lowe et al. | |
| 2008/0031004 A1 | 2/2008 | Chu | |
| 2008/0079271 A1* | 4/2008 | Maruko | B60R 19/52 293/102 |
| 2008/0259628 A1* | 10/2008 | Lin | B60Q 1/2623 362/520 |
| 2008/0308332 A1 | 12/2008 | Gonzalez-Salvador | |
| 2009/0008818 A1 | 1/2009 | Fayt | |
| 2009/0058141 A1 | 3/2009 | Hirukawa | |
| 2009/0152032 A1 | 6/2009 | Klotten et al. | |
| 2011/0204680 A1* | 8/2011 | Fortin | B60R 19/18 296/193.1 |
| 2012/0294028 A1 | 11/2012 | Wainscott et al. | |
| 2013/0021814 A1* | 1/2013 | Tanaka | B62D 25/084 362/496 |
| 2013/0033069 A1 | 2/2013 | Hwang | |
| 2013/0070471 A1* | 3/2013 | Pickholz | B60Q 1/0408 362/520 |
| 2013/0187395 A1* | 7/2013 | Hanson | B60R 19/52 293/115 |
| 2013/0265791 A1* | 10/2013 | Dassanayake | F21S 43/14 362/520 |
| 2013/0314935 A1* | 11/2013 | Tokieda | G02B 6/0001 362/511 |
| 2014/0059859 A1 | 3/2014 | Townson et al. | |
| 2014/0062140 A1 | 3/2014 | Townson et al. | |
| 2014/0117721 A1 | 5/2014 | Ring et al. | |
| 2015/0091328 A1 | 4/2015 | Pugh-Jones et al. | |
| 2017/0327156 A1* | 11/2017 | Tsumiyama | B62D 25/085 |

FOREIGN PATENT DOCUMENTS

| | | |
|---|---|---|
| WO | 2005108164 A1 | 11/2005 |
| WO | 2013189064 A1 | 12/2013 |

OTHER PUBLICATIONS

Non-final Rejection dated Nov. 28, 2018 for U.S. Appl. No. 15/397,857.
Non-final Rejection dated Aug. 31, 2018 for U.S. Appl. No. 15/397,944.
Non-final Rejection dated May 3, 2018 for U.S. Appl. No. 15/398,068.
Final Rejection dated Nov. 29, 2018 for U.S. Appl. No. 15/398,068.
Office Action dated Jun. 5, 2019 for U.S. Appl. No. 15/397,944, filed Jan. 4, 2017.
Office Action dated Sep. 26, 2019 for U.S. Appl. No. 15/397,944, filed Jan. 4, 2017.
Office Action dated Feb. 20, 2019 for U.S. Appl. No. 15/397,944, filed Jan. 4, 2017.

* cited by examiner

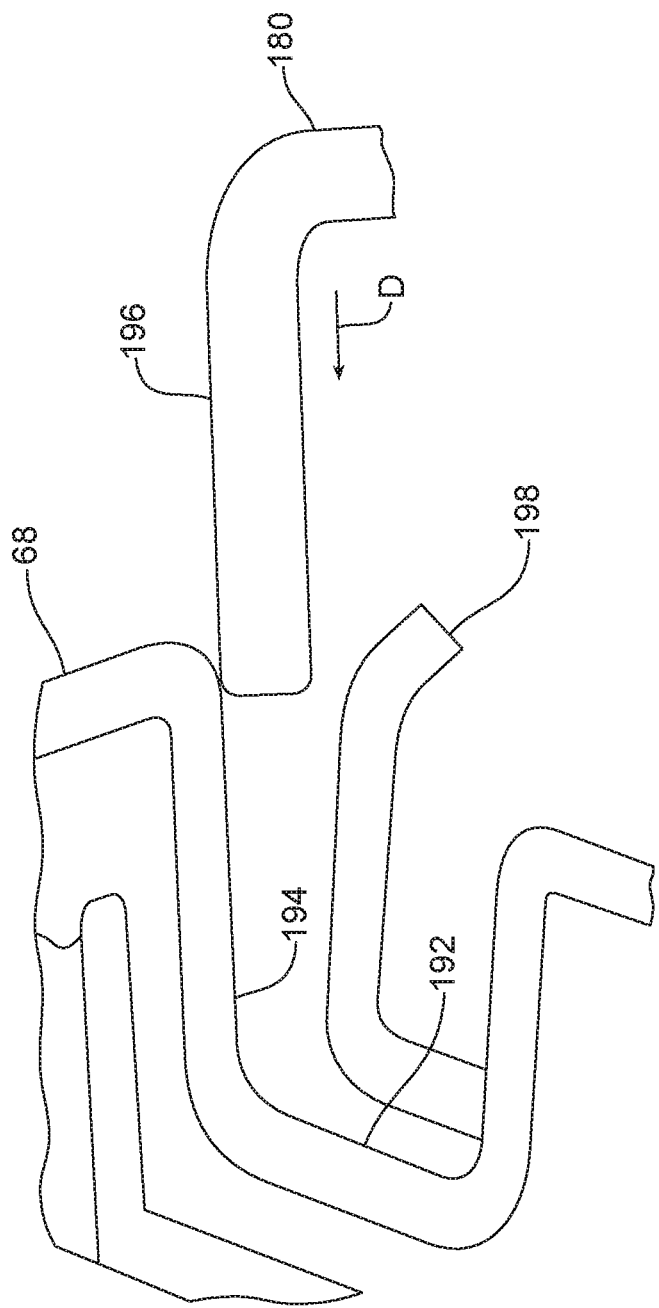

LOOSE LAYERED BUILD COMPONENTS AND VEHICLE FRONT END ASSEMBLY STRATEGY

This is a continuation of prior U.S. patent application Ser. No. 15/398,068 filed on Jan. 4, 2017 the full disclosure of which is incorporated herein by reference.

TECHNICAL FIELD

This document relates generally to vehicle manufacturing, and more specifically to a headlight assembly.

BACKGROUND

Conventional vehicle front end design and construction typically relies on independent locating, support, and attachment features for vehicle front end components during the assembly process. This is particularly true for the visible exterior, or skin, components such as headlamp assemblies, grilles, and fascia. This individualized approach is intended to ensure the aesthetic look of the exterior of the front end assembly which is known to be of significant importance to the customer.

Given the importance of the aesthetic look of the front end assembly, manufacturers expend significant effort through tooling, fixtures, and manpower to establish consistent gap widths particularly between the visible skin components. Headlight assembly installation, for example, is discrete and designed to establish a consistent gap width and flushness between the headlight assembly and related fender. In other words, locating, supporting, and attaching of the headlight assemblies occurs in more or less one sequence, either before or after another front end component.

Traditionally, the headlight assemblies are attached to the vehicle body relative already secured fenders so as to establish consistent gap widths therebetween and flushness relative the fenders. Such consistency and flushness is expected and suggests quality craftsmanship to the customer. Once attached, the headlight assemblies are no longer adjustable. Thus, the subsequent attachment of another skin component (e.g., the radiator grille) is likewise discreetly accomplished. The grille is positioned between the headlight assemblies and attached to the vehicle body such that the gap widths between each headlight assembly and the grille are the same width. Given the fixed locations of the headlight assemblies, the ability to establish such consistent gap widths, however, is limited. Ultimately, the grille is positioned to establish the most consistent gap widths and flushness possible given the fixed locations of the headlight assemblies.

A more recent effort to achieve consistency in the aesthetic look of the front end assembly involves modular construction. Such modular construction involves, for instance, subassembly of front end components (e.g., bumper covers, headlight assemblies, grilles and/or other components) which can then be assembled to the vehicle body in one operation. Even more, modular construction consolidates conventionally-designed front end components in an off-line operation and commonly yields improved consistency in gap widths, improved flushness and craftsmanship, and ultimately greater customer satisfaction. In addition, modular construction of subassemblies allows for more room at the end assembly facility and helps sequence complicated combinations of front end components thereby reducing overall complexity and higher cost facilities such as end assembly plants.

Despite these advantages over conventional vehicle front end design and construction/assembly, modular construction typically requires more resources, in-plant floor space, and special handling tooling, and creates ancillary costs, such as, shipping, commercial markup, additional labor, weight, and more when compared to conventional vehicle front end designs and assembly. Often the costs and/or other facility requirements alone can eliminate the possibility for modular construction. This can be the case even when improved craftsmanship and attributes such as aggressive appearance and uncommon or previously-unobtainable styling improvements are desired to allow new designs to be competitive in the marketplace.

Accordingly, a need exists for a different approach to vehicle front end assembly methods. Any such method(s) should be applicable to any vehicle, car or truck, and any vehicle body construction (e.g., unibody, body-on-frame, etc.), and should strive to enable superior craftsmanship, advanced and aggressive appearance and uncommon or previously-unobtainable styling improvements, ease of assembly, reduction of installation time and number of attachments, localized relationships of front end components and subassemblies to adjacent systems, components, and subassemblies and/or improved customer satisfaction all without the limitations associated with conventional vehicle front end design and construction or modular design.

Such improvements in vehicle front end assembly methods necessitate a further need for complimentary improvements in vehicle front end component designs and subassemblies of such components. Individual front end components and/or subassemblies should incorporate combinations of hands-free, anti-rotation, sliding or slide-capable, and other assembly-aiding attributes which would not be required for conventional and/or modular vehicle assembly. Such attributes should be integral in the component designs in order to reduce or avoid costly assembly tooling and should allow for improved craftsmanship and elements such as aggressive appearance and uncommon or previously-unobtainable styling improvements.

SUMMARY

In accordance with the purposes and benefits described herein, a headlight assembly for assembly adjacent at least one skin component of a vehicle front end is provided. The headlight assembly includes a housing supporting at least one light, and a lens attached to the housing, the lens including at least one attribute for engaging the at least one skin component.

In one possible embodiment, the at least one attribute includes an aperture formed in the lens. In another, the aperture extends through the housing.

In another possible embodiment, the aperture is a hole having a countersunk portion. In still another, the countersunk portion is formed in the lens and extends a distance from a surface of the lens for guiding the at least one skin component.

In yet another possible embodiment, the at least one skin component is a grille and the at least one attribute restricts movement of the headlight assembly relative the grille in a Y-axis direction forming a margin between the headlight assembly and the grille.

In yet still another possible embodiment, the at least one attribute is a channel formed in the lens for receiving the at least one skin component. In another, the at least one attribute includes a bracket extending from the channel for guiding the at least one skin component into the channel.

In still one other possible embodiment, the at least one skin component is a facia and the at least one attribute restricts movement of the facia relative the headlight assembly in a Z-axis direction.

In yet another possible embodiment, the at least one attribute includes at least one clip for securing the at least one skin component. In another, the at least one skin component is a grille and the at least one attribute restricts movement of the grille relative the headlight assembly.

In one additional possible embodiment, the at least one attribute is a cavity formed in the lens for receiving an overlapping portion of the at least one skin component. In still another, the at least one skin component is a grille and the at least one attribute restricts movement of the grille relative the headlight assembly.

In one other possible embodiment, a headlight assembly for assembly adjacent at least one component of a vehicle front end includes a housing supporting at least one light, the housing having at least one attribute for engaging a first component of the vehicle front end and restricting movement of the headlight assembly in a Z-axis direction, and a lens attached to the housing, the lens having at least one attribute for engaging a second component of the vehicle front end.

In another possible embodiment, the at least one attribute for engaging the first component of the vehicle front end includes a first pin extending from the housing.

In yet another possible embodiment, the at least one attribute for engaging the second component of the vehicle front end includes an aperture formed in the lens for restricting movement of the headlight assembly relative the second component in a Y-axis direction. In another, the aperture extends a distance from a surface of the lens for receiving the second component.

In yet still another possible embodiment, the at least one attribute for engaging a second component of the vehicle front end is a channel formed in the lens for restricting movement of the headlight assembly in a Z-axis direction relative the second component.

In one other possible embodiment, a headlight assembly includes a housing supporting at least one light, the housing having at least one attribute for aligning the headlight assembly during assembly, and a lens attached to the housing, the lens having at least one attribute for aligning same headlight assembly during assembly.

In another possible embodiment, the at least one housing attribute includes a pin and the at least one lens attribute includes a channel.

In the following description, there are shown and described several preferred embodiments of the headlight assembly for a vehicle front end. As it should be realized, the headlight assembly is capable of other, different embodiments and its several details are capable of modification in various, obvious aspects all without departing from the methods as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the method of assembling a vehicle front end to a body and complimentary improvements in vehicle front end components and subassemblies, and together with the description serve to explain certain principles thereof. In the drawing figures:

FIG. 19 is a cross sectional view of the lens of the headlight assembly.

Reference will now be made in detail to the present embodiments of the vehicle front end components and subassemblies and related methods of assembling a vehicle front end to a body, examples of which are illustrated in the accompanying drawing figures, wherein like numerals are used to represent like elements.

DETAILED DESCRIPTION

Figure 1:
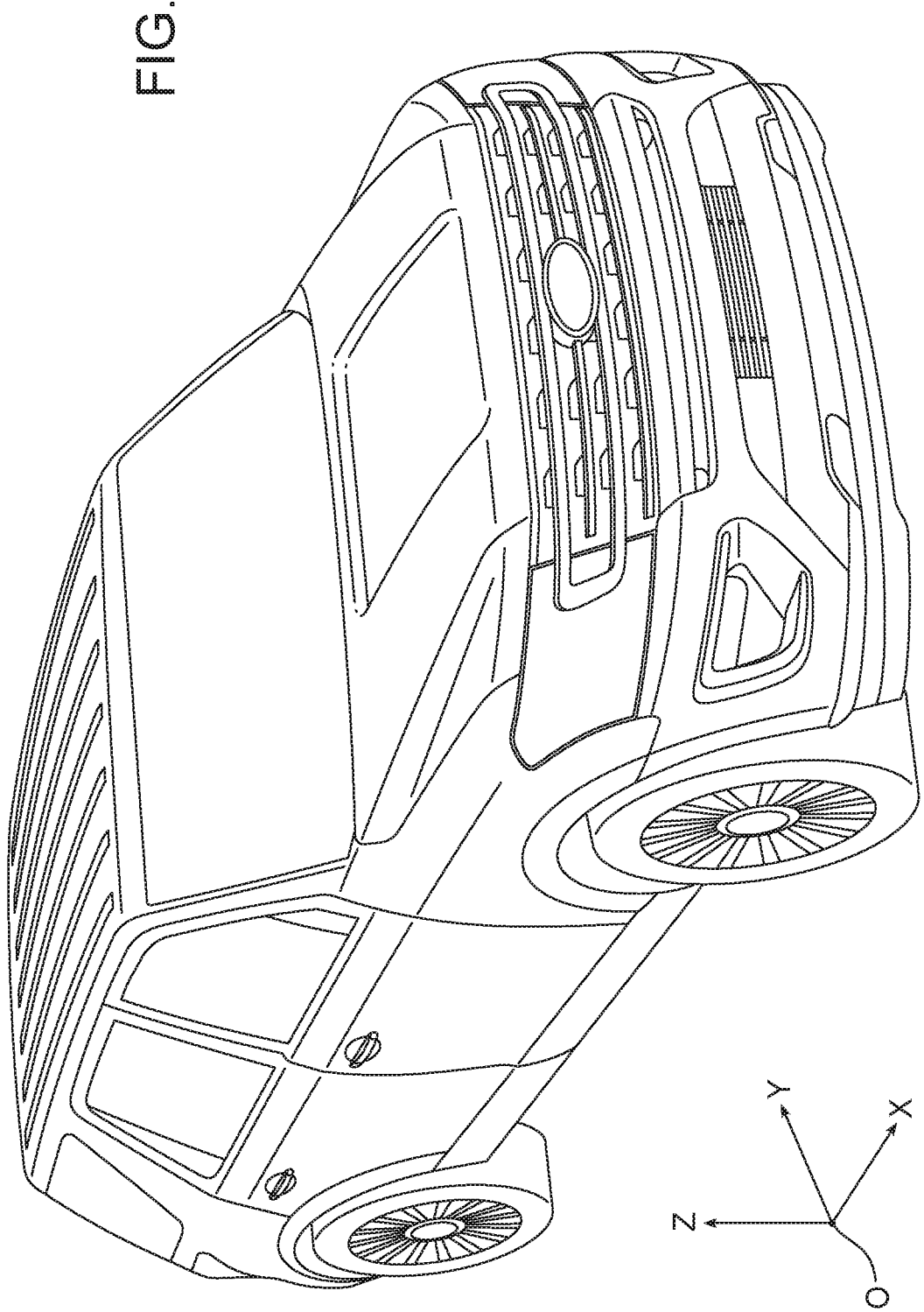
FIG. 1 is a perspective view of a vehicle and a Cartesian coordinate system.

Reference is now made to FIG. 1, which broadly illustrates a perspective view of a vehicle 10. The vehicle 10 shown is a sport utility vehicle which will be used to describe one embodiment of the vehicle front end assembly methods and related vehicle front end components and subassemblies of such components. It should be appreciated, however, that the described methods, components, and subassemblies, may be utilized with any type of vehicle (e.g., cars, pickup trucks, mini-vans, sport utility vehicles, vans, and various types of trucks, etc.).

As shown in FIG. 1, a three dimensional Cartesian coordinate system is provided which generally orients the vehicle 10 relative X, Y, and Z directions. The coordinate system includes an origin O and X, Y, and Z axis lines oriented as shown by the arrows. Axis line X generally represents an X-axis direction along a length of the vehicle, axis line Y generally represents a Y-axis direction across a width of the vehicle, and axis line Z generally represents a Z-axis direction along a height of the vehicle.

Throughout the specification, reference will be made to the X-axis direction, the Y-axis direction, and the Z-axis direction which will generally coincide with the X, Y, and Z directions of the coordinate system. For example, the phrase "restricted in the X-axis direction" indicates a restriction of movement along a length of the vehicle. The same applies for restrictions in the Y-axis and Z-axis directions. Such restrictions may be absolute wherein no movement in the identified direction is allowed or may be limited wherein movement within certain limits or tolerances (defined, predetermined, or otherwise) in the identified direction is allowed. Similarly, the phrase "an X-axis locator" refers to any attribute of a component, whether an external skin component or otherwise, that restricts movement in the X-axis direction. Examples of such attributes include surfaces of components, apertures, including slots, holes, countersunk and tapered slots and holes, and surfaces within apertures, and pins, straps, tabs, notches, ridges, etc.

Figure 2:
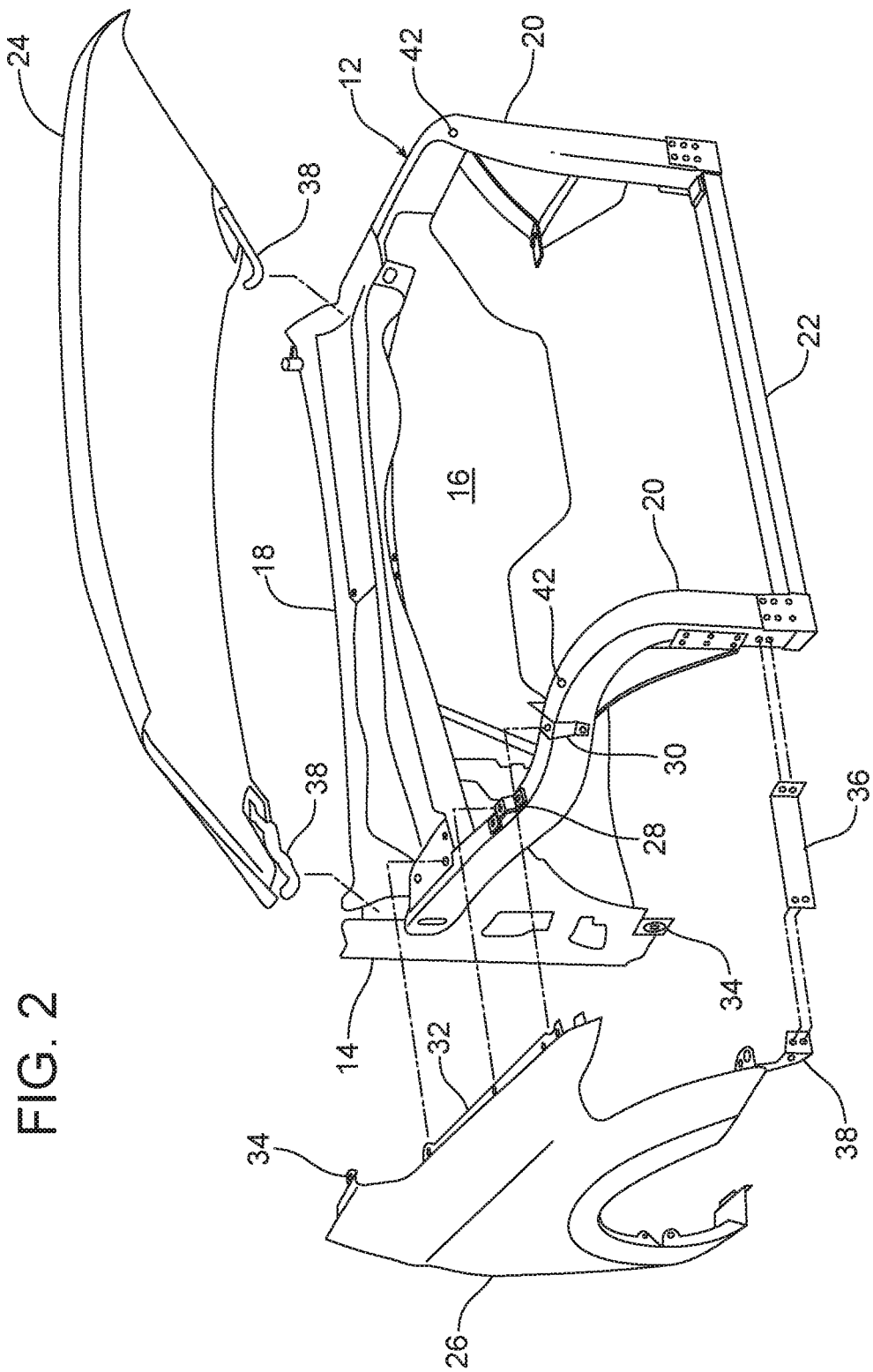
FIG. 2 is a perspective view of a front end of a vehicle with a hood, fenders and fender bracket shown in exploded view.

Reference is now made to FIG. 2 which illustrates an exploded view of a partial vehicle front end 12 of the vehicle 10. As shown, the vehicle front end 12 includes a portion of an A-pillar 14, a firewall 16, a cowl 18, opposing hydroform brackets 20, a support or bunny bracket 22 connected between the hydroform brackets, and a hood 24 supported by the cowl. Although not shown, the vehicle cowl 18 typically further supports a windshield, dashboard, and instrument panel while separating the passenger compartment from the engine compartment.

In assembling the vehicle front end 12, right and left side fenders 26 are attached at varying points. The left side fender 26 is not shown in this figure for clarity. Brackets, including bracket 28 and a fender nose bracket 30, are attached to the hydroform brackets 20 and used as Z-axis locators to restrict movement of the fender 26 in the Z-axis direction. The fenders 26 are also attached along an upper surface of the hydroform brackets 20. Tab 32, for example, is attached adjacent the A-pillar 14 and tab 34 is attached directly to the A-pillar. As shown, at least the tab 32 adjacent the A-pillar 14 is used as an X-axis locator to restrict movement in the X-axis direction and accommodate positioning of the fender 26 relative a door (not shown) of the vehicle 10 to establish a consistent margin or gap width and flushness therebetween. A bracket 36 is used to connect a lower front portion of the fender 26 to a lower front portion of the hydroform bracket 20. In the described embodiment, the bracket 36 is attached between the hydroform bracket 20 and a fender reinforcement bracket 38.

As further shown in FIG. 2, a hood 24 is also attached to the vehicle front end 12 at varying points. More specifically, the hood 24 is attached to the cowl 18 using a pair of hinges 38 as is known. Although shown in an exploded and open position (raised to approximately a 45° angle), the hood 24 is positioned during assembly to establish a consistent margin and flushness between the hood and the fenders 26. In order to establish proper positioning prior to attachment, a fixture (not shown) uses reference locators 42 in the hydroform brackets 20. The locators 42 include 2-way and 4-way locators which restrict movement in the X-axis and/or Y-axis directions allowing the hood 24 to be positioned so that a consistent margin and flushness between the hood 24 and the fenders 26 exists when the hood is attached and in the closed position.

Figure 3:
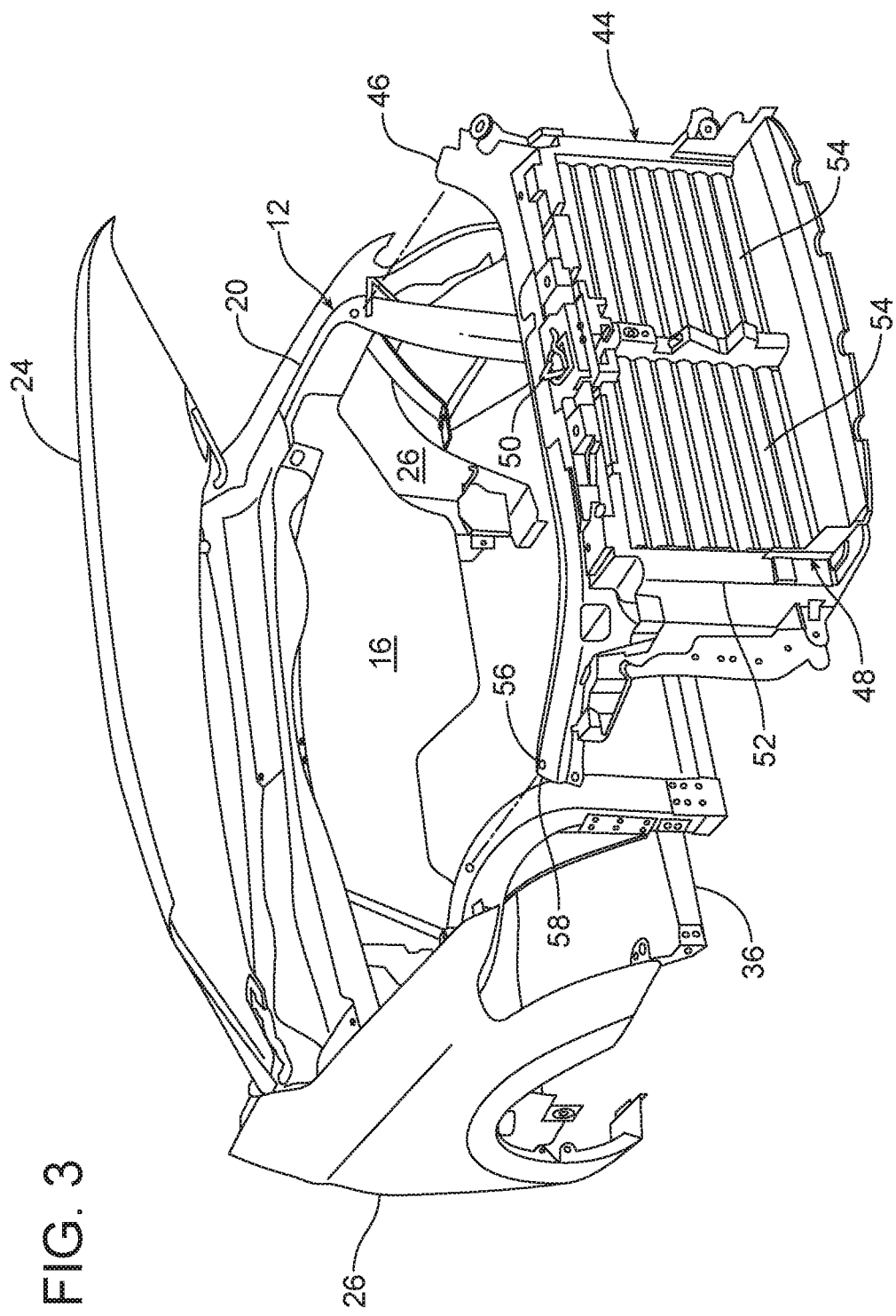
FIG. 3 is a perspective view of a front end of a vehicle with a bolster, active grille shutters, and a hood latch shown in exploded view.

As shown in FIG. 3, additional components including a cooling module assembly 44 are also attached to the vehicle front end 12 at varying attachment points. In the described embodiment, the cooling module assembly 44 includes a bolster 46, an active grille shutters (AGS) assembly 48, a cooling pack (not shown), and a hood latch 50. The AGS assembly 48 includes an AGS housing 52, a plurality of shutters 54, and control and activation mechanisms which are not shown for clarity. While an AGS assembly 48 is used to describe the vehicle front end assembly methods herein, the invention is not limited to vehicles having an AGS assembly. For those vehicles, attributes of the AGS housing 52 used in the assembly methods described in detail below may be provided by other components. For example, a bolster or a facia support member may include some or all of the attributes of the AGS housing in alternate embodiments.

In addition, the cooling pack may take various forms depending on the type of vehicle being assembled. A typical cooling pack includes a radiator, condenser, and related components while electric vehicles and hybrids, for example, may include different variations of heat exchangers and components. Such cooling pack components may be selected and combined in any manner known in the art depending on the vehicle's heating, ventilation, and air conditioning needs.

For the purpose of understanding the vehicle front end assembly methods described herein, the primary component of the cooling module assembly 44 used in describing the assembly methods will be the AGS housing 52. Like several other front end components, the AGS housing 52 includes certain attributes used as locators throughout the described assembly process. The remaining components of the cooling module assembly 42 are of less importance in the described assembly methods but themselves may include certain attributes in alternate assembly methods.

Although shown exploded apart from the vehicle front end 12 in FIG. 3, the bolster 46 is attached to the hydroform brackets 20 using locators. The locators include 2-way and 4-way locators 56 which restrict movement in the X-axis and Y-axis directions. A surface 58 on the underside of the bolster 46 acts as a Z-axis locator further restricting its movement in the Z-axis direction. Prior to attachment of the bolster 46 to the hydroform brackets 20, the AGS assembly 48 is attached to the bolster utilizing a Y-axis locator 60 on the bolster. The y-axis locator 60 centers the AGS assembly 48 on the bolster 46.

In the described method of assembling the vehicle front end 12, external skin components, or visible components, are supported using at least one non-skin component, or non-visible component, such that a first skin component is moveable relative the non-skin component(s). For example, the headlight assemblies 62, i.e., skin components, are supported relative the cooling module assembly 44, i.e., a non-skin component, and the fenders 26, i.e., skin components, such that movement of the headlight assemblies is restricted in the X-axis direction and the Z-axis direction. In this manner, the headlight assemblies 62 are free to move in the Y-axis direction while supported and prior to attachment to the vehicle front end 12. Since each of the right side and the left side headlight assemblies 62 is the same, further description of the assembly methods will focus on the vehicle's right or passenger side headlight assembly with the understanding that the same description applies equally to the left or driver side headlight assembly.

Figure 4:
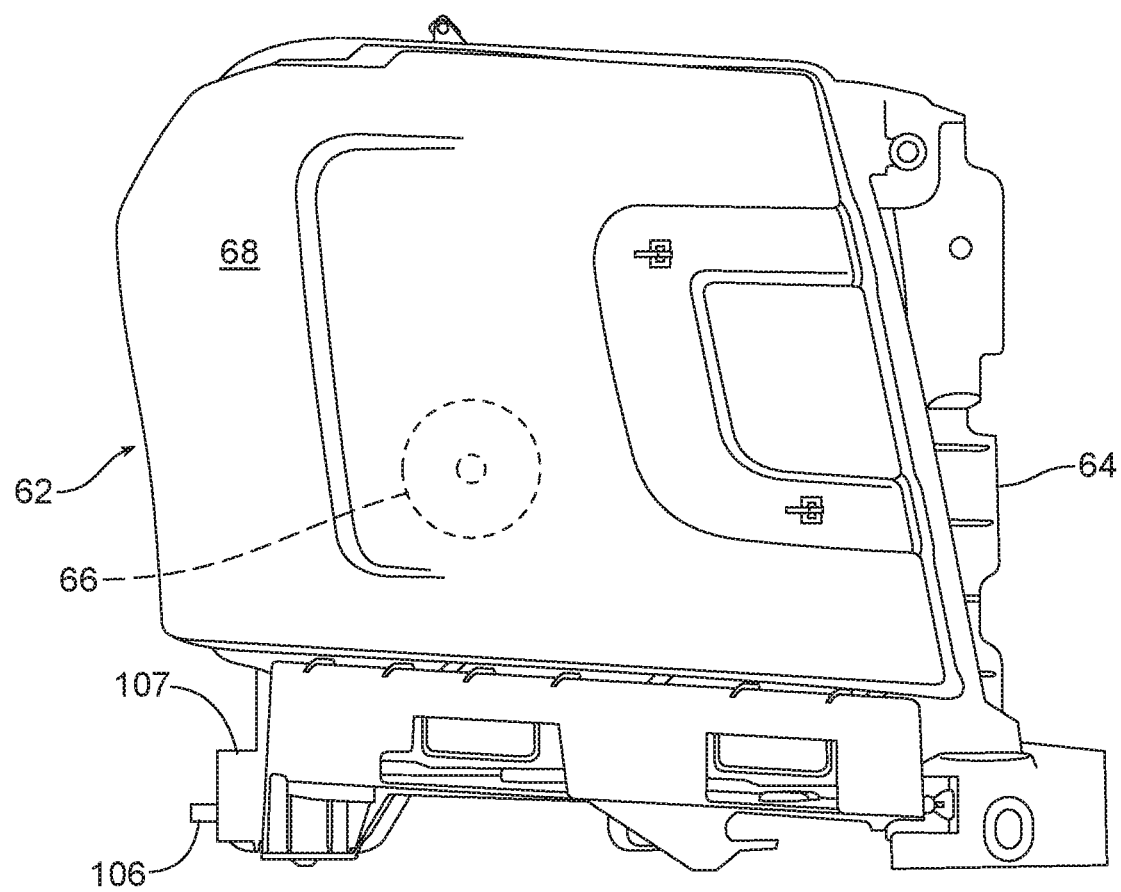
FIG. 4 is a perspective view of a passenger side headlight assembly.

As shown in FIG. 4, the headlight assembly 62 includes typical features such as a housing 64, lights 66 and a lens 68. The headlight assembly 62 in the described embodiment, however, further includes certain attributes that restrict movement of the headlight assembly 62 in one or more directions during assembly. As noted above, these attributes may include exterior surfaces of components, apertures, including slots, holes, countersunk and tapered slots and holes, surfaces within apertures, and pins, straps, tabs, notches, ridges, etc. Certain of these attributes are used to support the headlight assembly 62 and restrict its movement during the assembly process. This allows the headlight assembly 62 to be initially supported in position relative the fender 26 and cooling module assembly 44 while allowing for movement in order to align the headlight assembly with a grille 116 and corresponding fender 26. These attributes may vary for different vehicles including, for example, vehicles which do not utilize an AGS assembly. In addition, others of these headlight assembly attributes are used to support, locate, engage, and/or restrict movement of other components during the assembly process as will be described in greater detail below.

In a similar manner as the headlight assembly 62, the fenders 26 and AGS housing 50 each include attributes that support and/or restrict movement of the headlight assembly 62. In the described embodiment, these attributes support the headlight assembly 62 and prevent rotation and/or dislodgment from the vehicle 10 during assembly. As suggested above, the headlight assembly 62 is supported relative the fenders 26 and cooling module assembly 44. In the described embodiment, four attributes of the headlight assembly 62 combine to support the headlight assembly, restrict its movement, and align it with at least one of the fenders 26, the hood 24, and/or the cooling module assembly 44. Of course additional or fewer attributes could be utilized in alternate embodiments in accordance with the invention.

Figure 7:
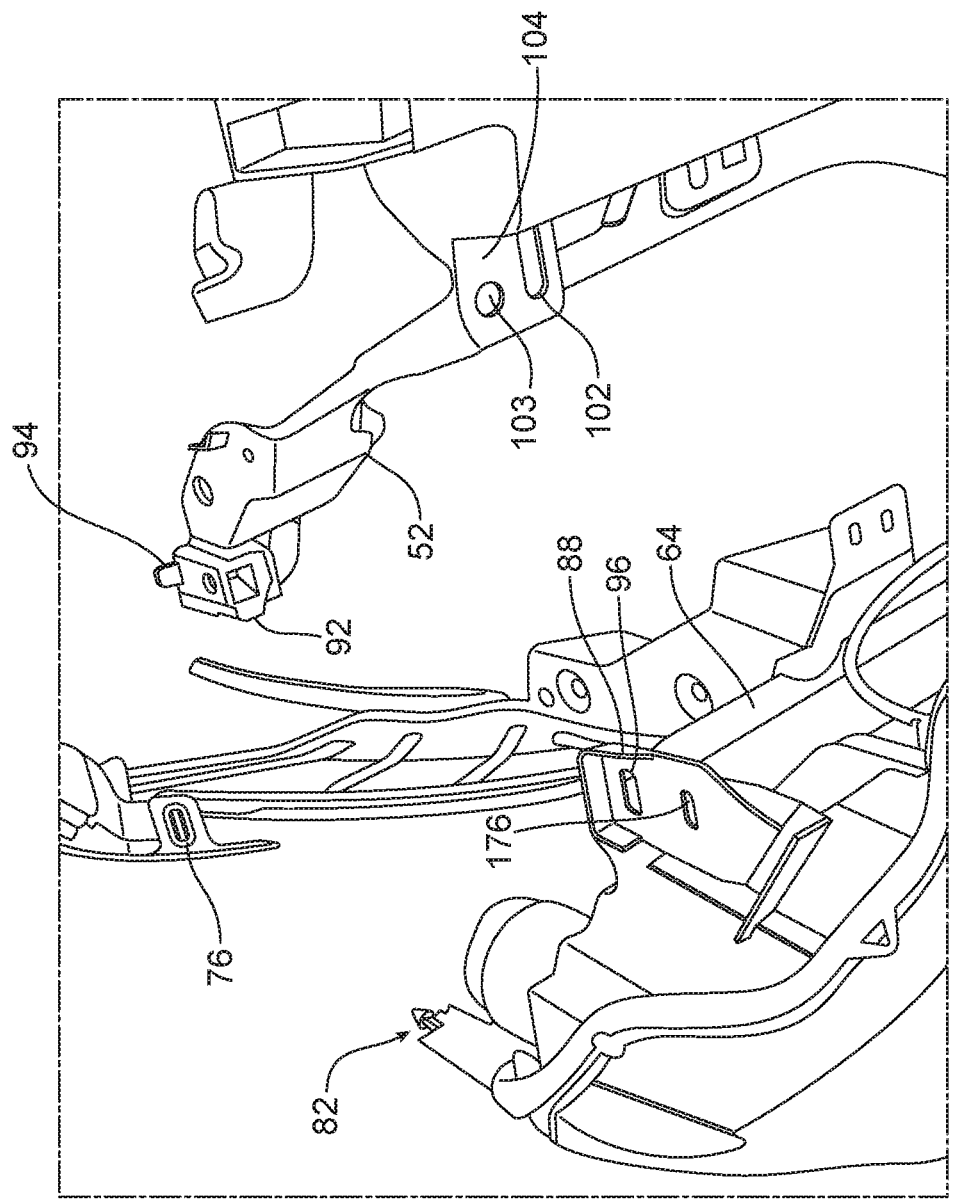
FIG. 7 is a partial perspective view of an active grille shutters housing attribute receiving a passenger side headlight assembly attribute during assembly.

In order to align the headlight assembly 62 with the fender 26, a pin 72, referred to hereafter as a snap stud, extends from a rear of the headlight assembly housing 64. The snap stud 72 includes a hexagonal base for driving a threaded extension into the housing 64 to secure the snap stud thereto. As best shown in FIG. 7, the snap stud 72 extends further from the housing 64 than each of the other attributes. Accordingly, the snap stud 72 is the first attribute to engage the vehicle front end 12 during assembly. More specifically, the snap stud 72 engages a first attribute of the fender 26 and initially aligns the headlight assembly 62.

Figure 5:
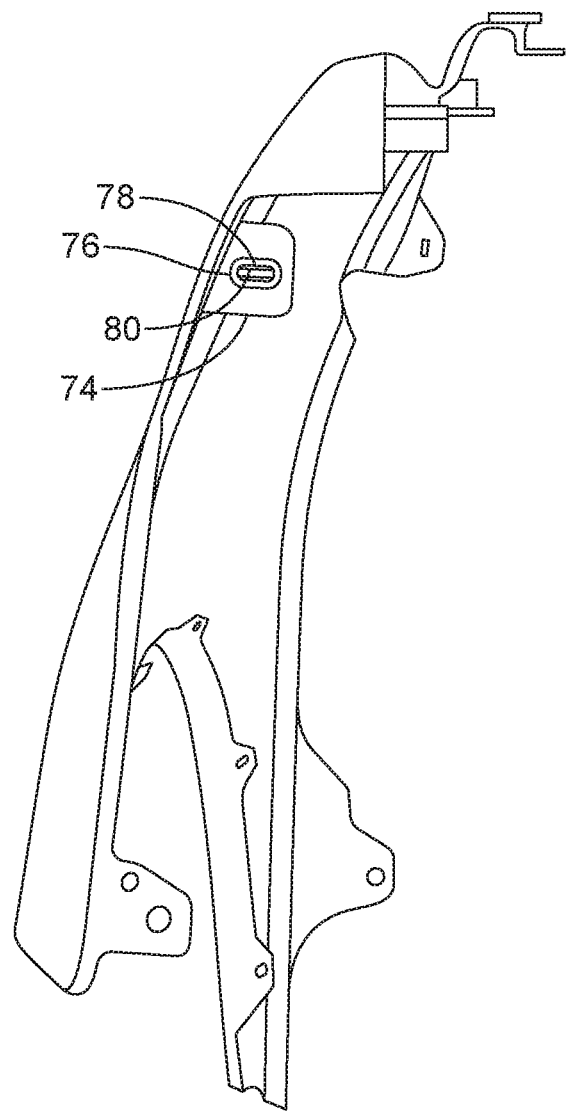
FIG. 5 is a front plan view of a passenger side fender.

As suggested above and best shown in FIG. 5, the fender 26 includes a first attribute which acts as a Z-axis locator. In the described embodiment, the first fender attribute includes a lug 74 extending from an interior surface of the fender 26 generally in the Y-axis direction toward the center of the vehicle 10. The lug 74 may be integrally formed or otherwise and includes a slot which receives a grommet 76 having a similarly shaped slot 78 for receiving the snap stud 72 during assembly. The grommet slot 78 may include a chamfer to provide further assistance in locating the slot with the snap stud 72 or otherwise.

Figure 6:
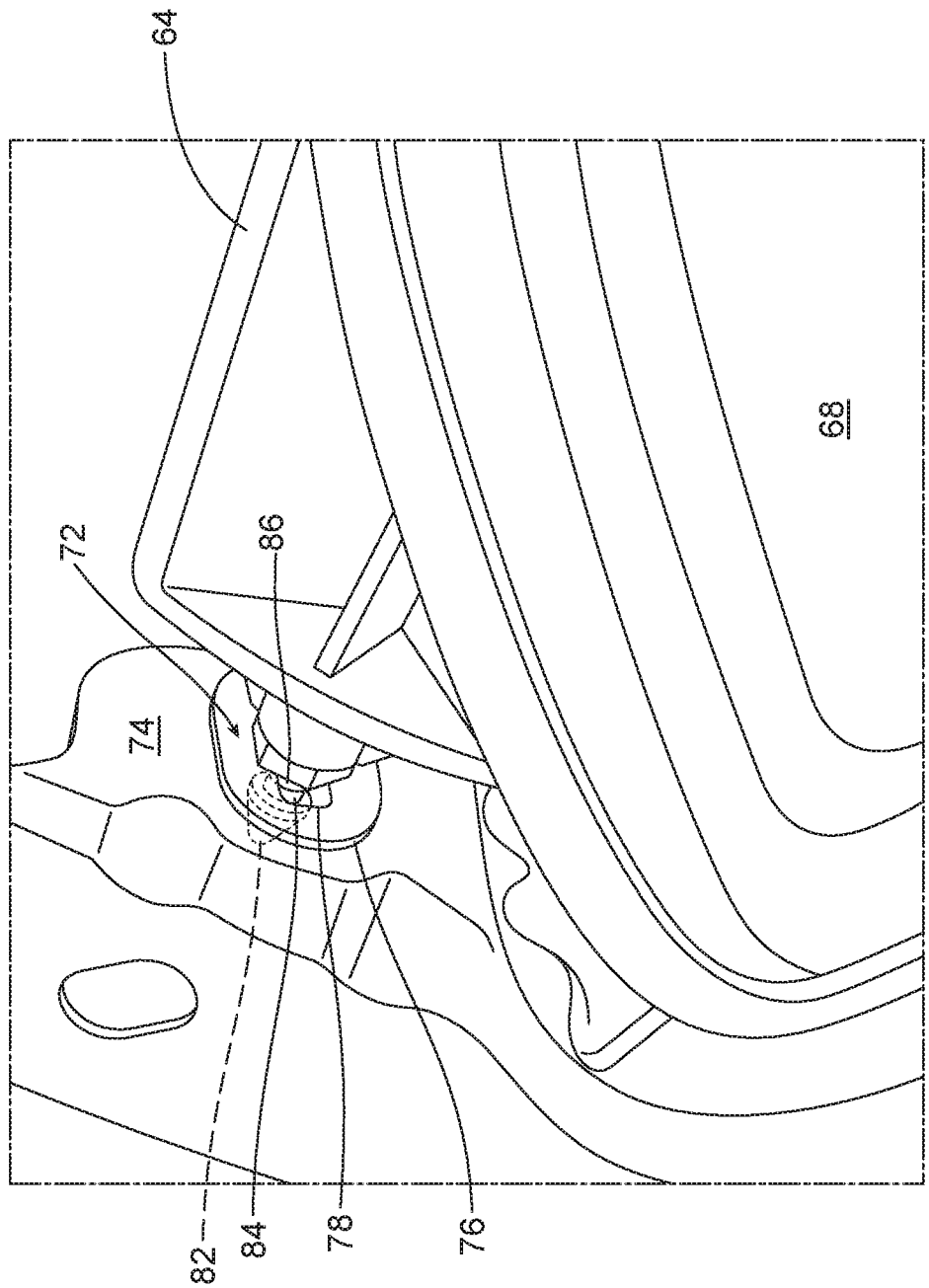
FIG. 6 is a partial perspective view of a fender attribute receiving a headlight assembly attribute during assembly.

As shown in FIG. 6, the grommet 76 is formed to include a ridge 80 within the slot 78. In the described embodiment, the ridge 80 extends inward on all four sides of the slot 78 and is designed to temporarily capture the snap stud 72 once inserted into the grommet 76. As shown, the snap stud 72 includes a head 82, a neck 84, and a base 86. Once inserted as shown by action arrow A, the head 82 is captured behind the grommet ridge 80 and is secured in position with the ridge adjacent the neck 84. It should be noted that this arrangement is sufficient to support the headlight assembly but also allows the snap stud to be removed from the grommet by pulling the headlight assembly 62 in a reverse direction if needed during assembly. The headlight assembly 62 is firmly attached to the vehicle front end 12 at a later step in the process.

In addition to temporarily capturing the snap stud 72 and supporting the headlight assembly 62, the grommet slot 78 serves as a Z-axis locator for the headlight assembly preventing movement along the Z-axis direction. Even more, the slot 78 allows the snap stud 72 and thus the headlight assembly 62 to move within the slot along the Y-axis direction for later alignment with other components including the fender 26 and/or other skin components. Following insertion of the snap stud 72 into position within the grommet 76, another attribute of the headlight assembly 62 engages the vehicle front end 12 essentially hanging the headlight assembly and securing it in position while allowing for movement in the Y-axis direction.

As shown in FIG. 7, the second attribute of the headlight assembly 62 is a strap 88 which is generally referred to as a self-locking strap in the described embodiment. The self-locking strap 88 is integrally formed with the headlight assembly housing 64, in the described embodiment, and extends generally in the X-axis direction from a rear surface of the housing 64. The housing 64 is a molded plastic or similar material and the strap 88 is thinly formed so as to flex during assembly from a normal or resting position to a flexed position. This allows the strap 88 to deflect over and then engage a first attribute of the AGS housing 52 during assembly.

In the described embodiment, the first AGS housing attribute is a receiver 92 integrally formed with the AGS housing 52. The receiver 92 includes an upwardly extending tab 94. As the headlight assembly 62 is installed, a distal end of the strap 88 deflects upward and over the tab 94 until the tab is aligned with a first aperture 96 formed in the strap. At this point, the tab 94 is captured in the first aperture 96, which is generally rectangular in shape. This allows the strap 88 to return to its normal, non-deflected position. In this position, the tab 94 projects through the first aperture 96 securing or hanging the headlight assembly 62 loosely in position. In addition to supporting the headlight assembly 62, the first aperture 96 is sized to allow movement of the tab 94 therein allowing the headlight assembly to move along the Y-axis direction for later alignment with other components.

Figure 8:
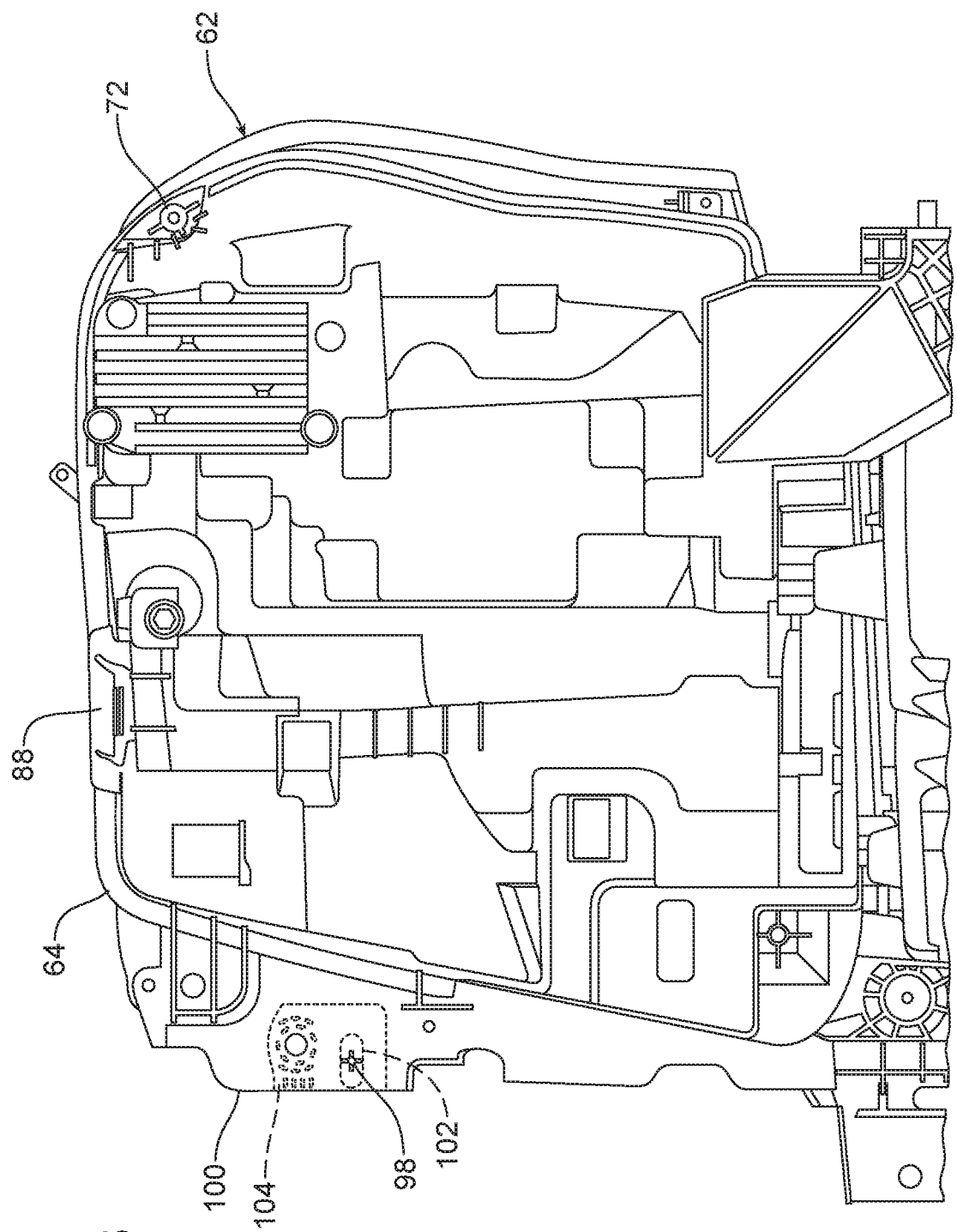
FIG. 8 is a rear plan view of a passenger side headlight assembly.

Further alignment of the headlight assembly 62 during assembly is provided by a guide pin in the described embodiment. As shown in FIG. 8, the guide pin 98 extends from a first lug 100 of the headlight assembly housing 64. In the described embodiment, the pin 98 is an integrally molded star pin which together with the first lug 100 form the third attribute of the headlight assembly 62. The first lug 100 is likewise integrally molded with the headlight assembly housing 64 in the described embodiment.

Figure 10:
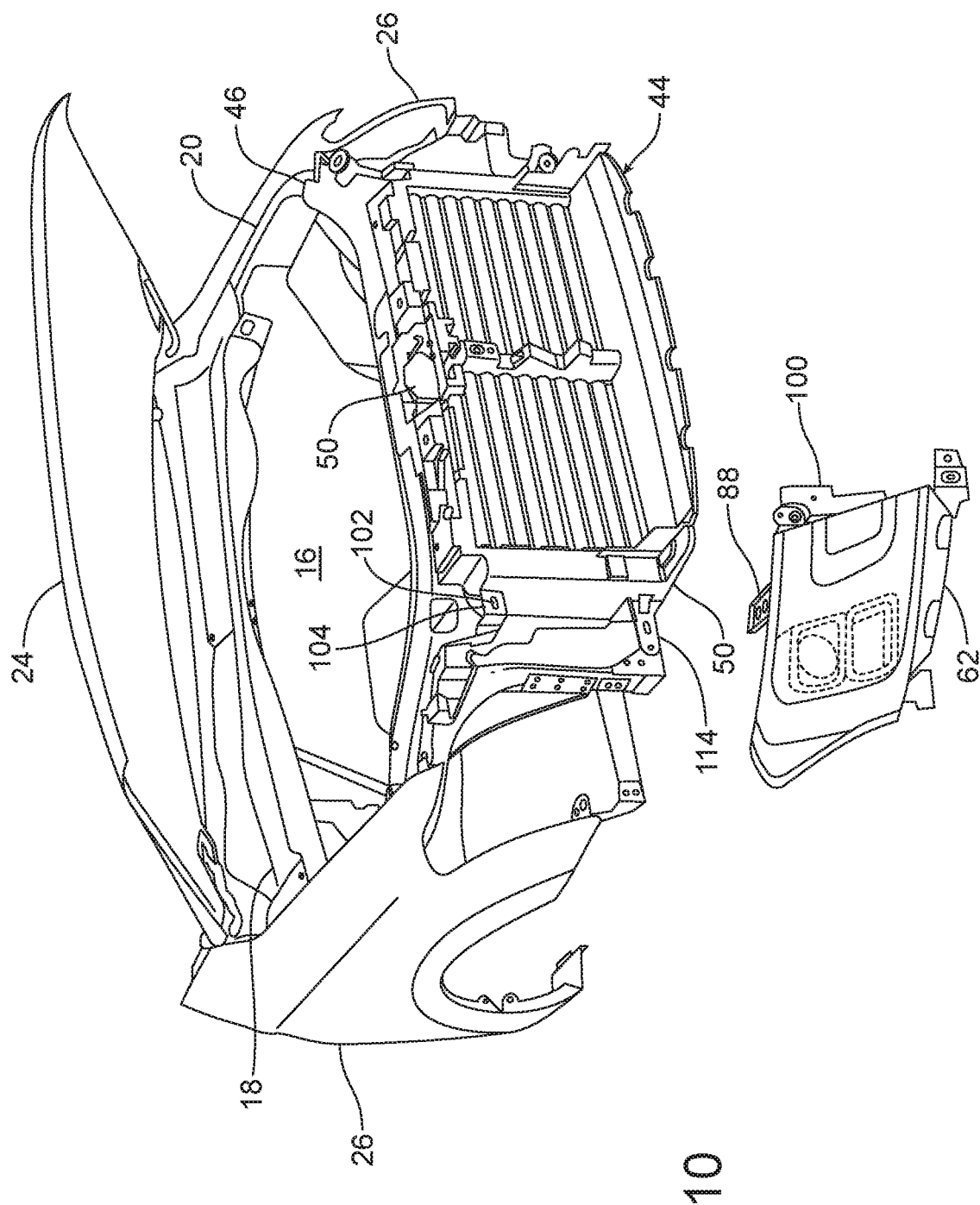
FIG. 10 is a perspective view of a front end of a vehicle with a headlight assembly shown in exploded view.

The guide pin 98 engages a slot 102 formed in a first surface 104 of the AGS housing 50 (best shown in FIGS. 7 and 10) during assembly. The slot 102 is a second AGS housing attribute and acts as a Z-axis locator further preventing movement of the headlight assembly 62 in the Z-axis direction. Although no chamfer is provided in the described embodiment, the slot 102 may include a chamfer to provide additional assistance in guiding the pin 98 into the slot. As with other attributes, the slot 102 allows the headlight assembly 62 to move within the slot along the Y-axis direction for later alignment with other components.

Figure 9:
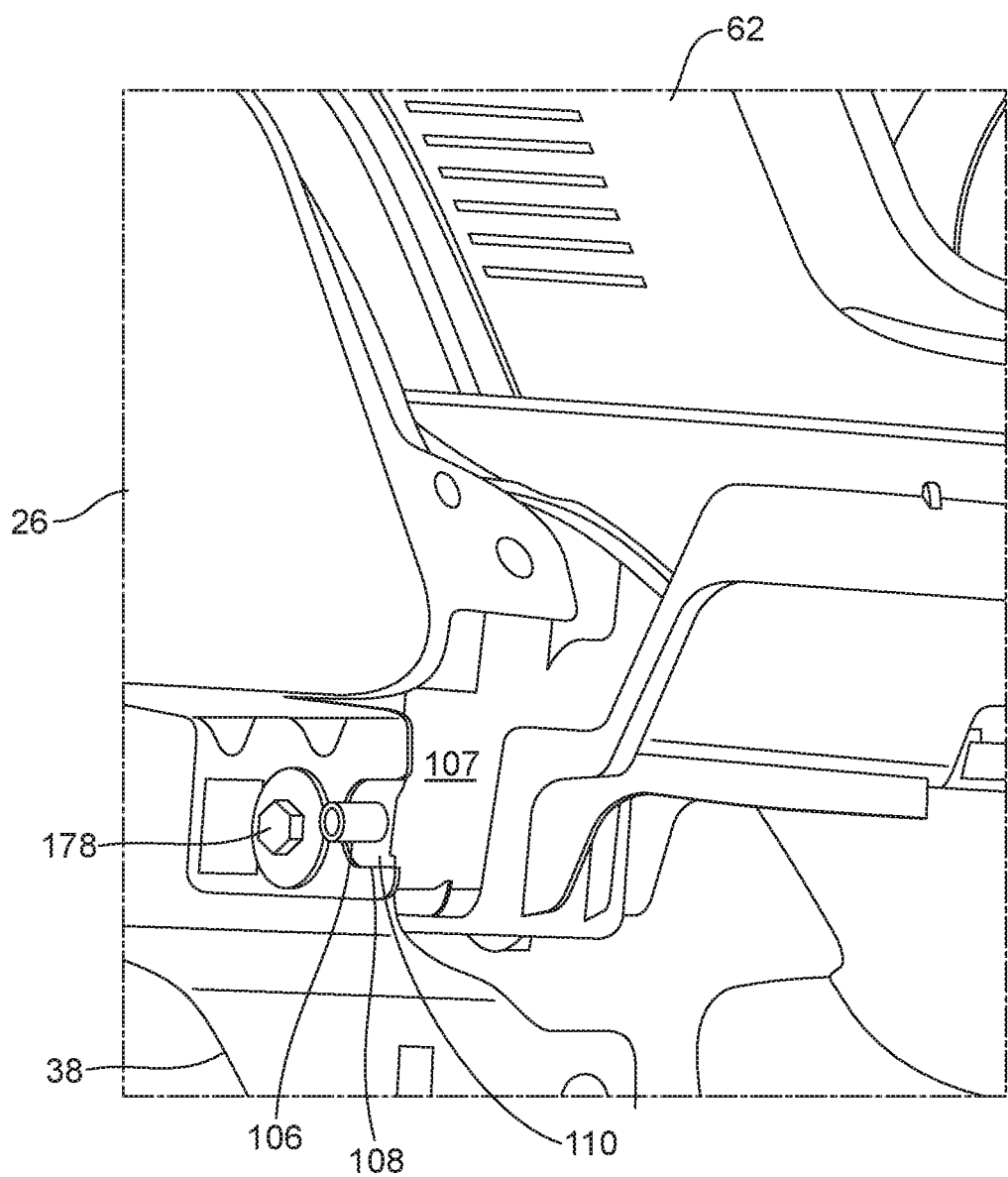
FIG. 9 is a partial side plan view of a headlight assembly pin engaging a fender support bracket.

Further preventing movement of the headlight assembly 62 in the Z-axis direction is a pin 106 that engages a second attribute of the fender 26 and acts as a Z-axis locator. As shown in FIG. 9 (best shown in FIG. 4), the pin 106 extends from a lower, outboard portion 107 of the headlight assembly 62. In the described embodiment, the fender 26 includes a fish mouth opening 108 for receiving the pin 106. In addition, the fender reinforcement bracket 38 may include a corresponding fish mouth opening 110, if not narrower as shown, which together with the fender fish mouth opening 108 receive the pin 106. Both openings are rounded along their open edges to guide the pin 106 during assembly.

Once engaged, the pin 106 and/or the fish mouth opening 108 prevent movement of the headlight assembly 62 along the Z-axis direction. As shown, the pin 106 is designed to extend beyond an outer surface of at least the fender reinforcement bracket 38 and/or the fender 26 to accommodate movement of the headlight assembly 20 in the Y-axis direction for later alignment with other components including the fender and/or other skin components. The designed extension is sufficient to accommodate a desired range of movement along the Y-axis direction without disengaging the fender reinforcement bracket 38 and/or the fender 26.

When the snap stud 72, self-locking strap 88, guide pin 98, and pin 106 of the headlight assembly 62 are engaged, movement of the headlight assembly along the X-axis direction is also limited. In the described embodiment shown in FIG. 10, the first surface 104 and a second surface 114 of the AGS housing 50 are integrally formed and both act as X-axis locators. Together, the surfaces locate the headlight assembly 62 along the X-axis direction and help prevent its rotation during assembly. Of course independent surfaces for locating the headlight assembly 62 in the X-axis direction may be added to the AGS housing 50 or additional integrally molded AGS surfaces or standoffs may be utilized in alternate embodiments.

At this stage of the described assembly process, the bolster 46 is attached to the hydroform brackets 20, the cooling module assembly 44 is attached to the bolster, and the hood 24 is positioned and attached to the cowl 18. The fenders 26 are attached to the A-pillar 14 and hydroform brackets 20, and loosely support the headlight assembly 62. The headlight assembly 62 is similarly loosely supported by the cooling module assembly 44, and more specifically the AGS housing 50, as described above.

Figure 11:
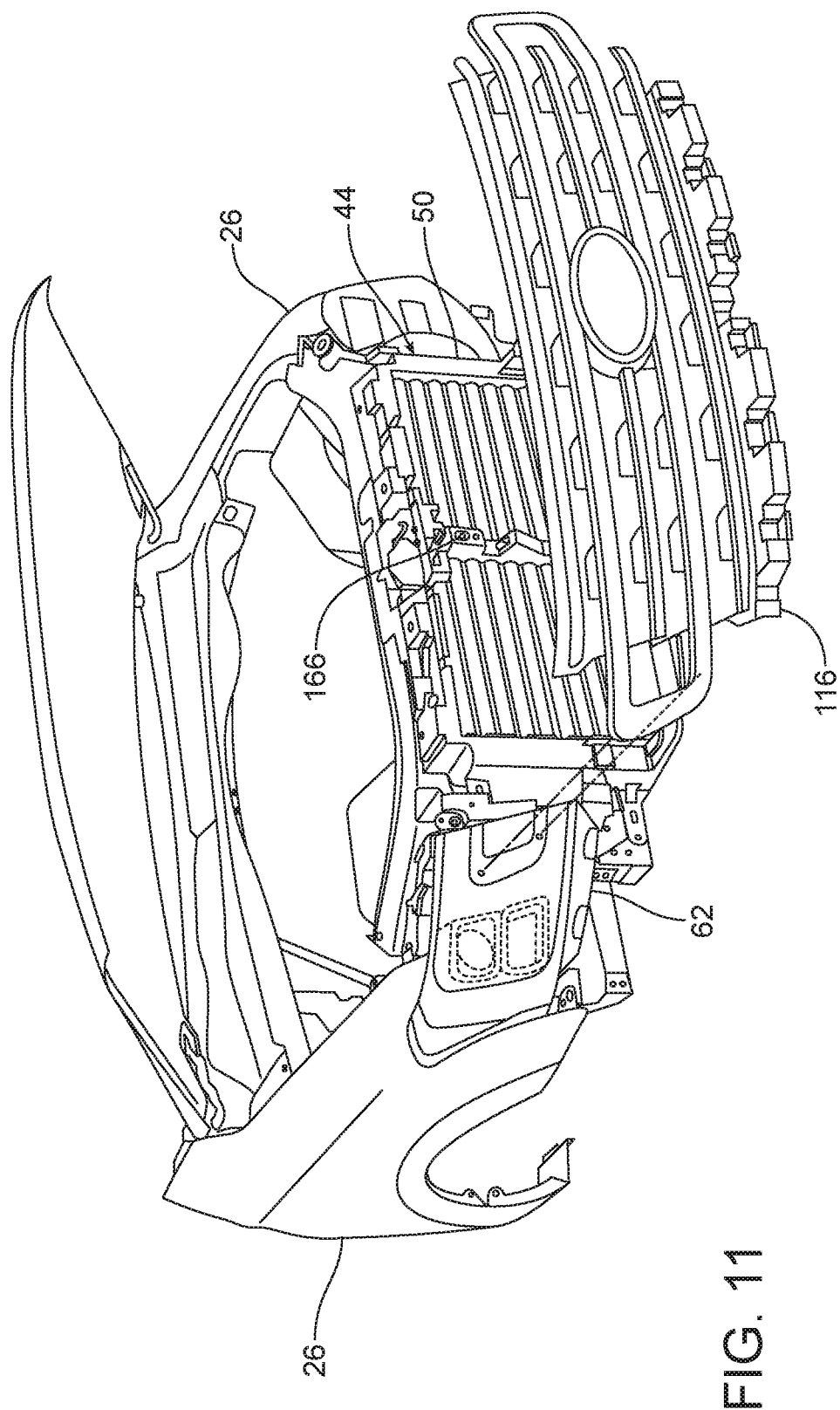
FIG. 11 is a perspective view of a front end of a vehicle with the grille shown in exploded view.

As shown in FIG. 11, the loosely supported headlight assembly 62 is then engaged by a grille 116 in the described embodiment. The grille 116 engages the headlight assembly 62 such that movement of the grille relative the headlight assembly is restricted. In other words, a second skin component, i.e., the grille 116, is joined to the first skin component, i.e., the headlight assembly 62, such that the first skin component and the second skin component are fixed relative one another and moveable relative at least one non-skin component, e.g., the cooling module assembly 44. In other words, the grille 116 acts as a fixture for properly aligning the headlight assemblies 62 relative the grille. In this manner, the grille 116 and headlight assemblies 62 are joined or coupled together in a manner that establishes a consistent margin or gap width and flushness therebetween.

Joining these skin components together in this manner allows the front end design engineer to incorporate certain features, including uncommon and/or previously-unobtainable styling improvements described in more detail below. Utilizing one skin component as a fixture for one or more other skin components provides for repeatable superior craftsmanship even with an aggressive appearance or use of uncommon styling improvements. The assembly methods provide these improvements with both ease of assembly and reduction of installation time and the number of attachments, and do so in a simple and cost effective manner, and without additional tooling.

Once the grille 116 and headlight assemblies 62 are joined, forming a subassembly 118, the entire subassembly remains loosely supported by the fenders 26. This allows the subassembly 118, shown in FIG. 12, to move in the Y-axis direction to allow centering of the grille 116/subassembly 118 while maintaining consistent margins or gap widths between the grille, the headlight assemblies 62, and the fenders 26 prior to attachment to the vehicle front end 12. In alternate embodiments, the headlight assemblies 62 may be designed to act as fixtures for engaging the grille 116 and restricting movement in a similar manner to that described above.

Figure 12:
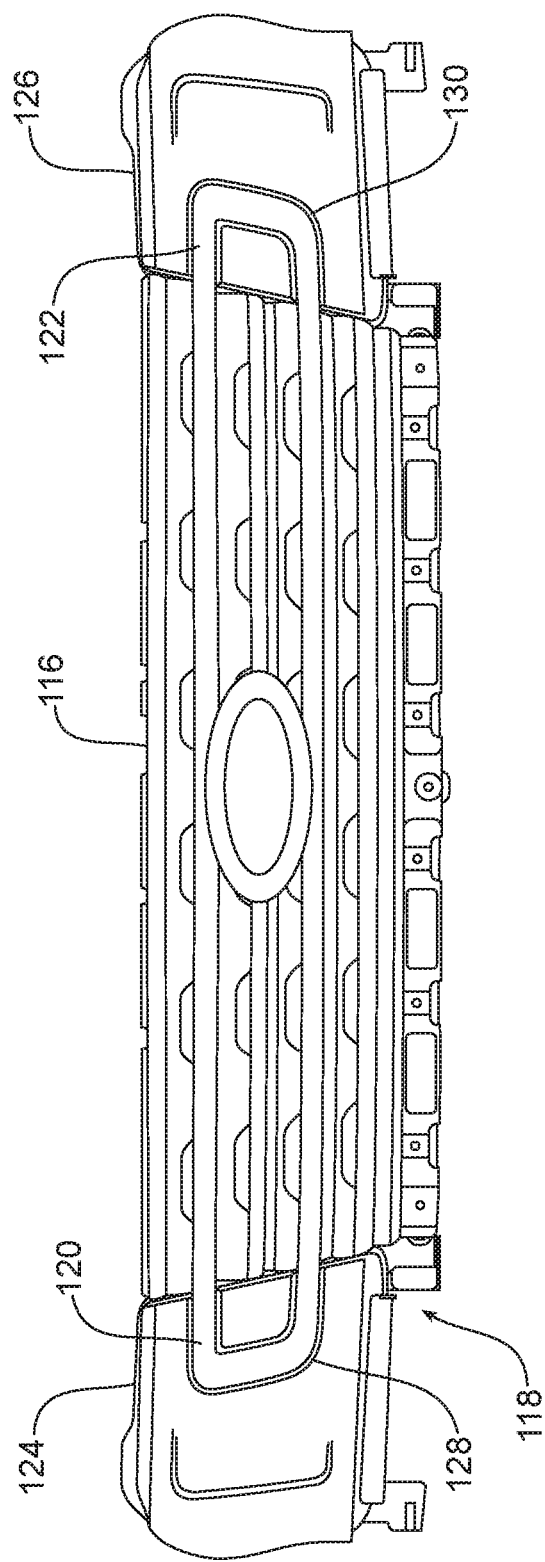
FIG. 12 is a front plan view of a subassembly of the vehicle front end including the headlight assemblies and the grille.

As noted above, joining skin components in a manner that establishes consistence positioning relative one another affords front end design engineers with a significant opportunity to improve the overall look of the vehicle through incorporation of certain design features. These vehicle front end features include, for example, various interlacing grille extensions which mesh the skin components together. As shown in FIG. 12, first and second loops 120, 122 extend from the grille 116 and interlace with an adjacent headlight assembly 124, 126 creating a meshed subassembly 118.

In the described embodiment, the first and second loops 120, 122 are integrally formed as part of the grille 116 and are generally rectangular in shape. In alternate embodiments the grille extensions may be attachments and each extension may include one or more loops. The loops could take on a variety of shapes including a first shape for the first loop and a second shape for the second loop. Alternate extensions may include shapes other than loops, for example, one or more straight extensions, various smooth curves, and/or circles. In other words, the interlacing extensions can take any shape.

Figure 13:
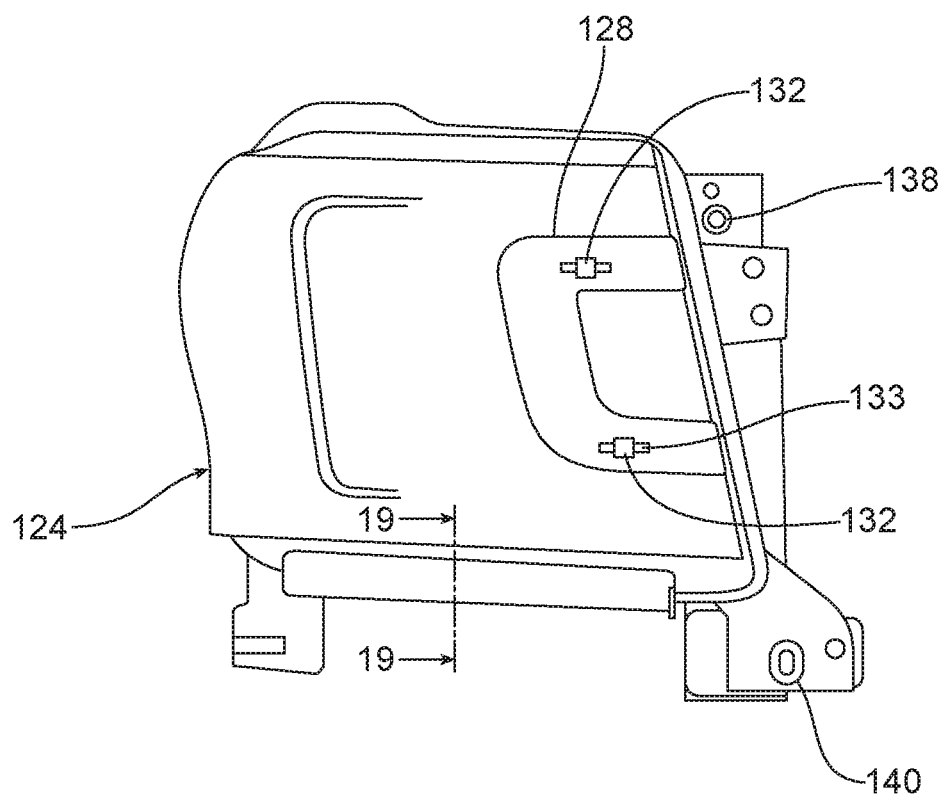
FIG. 13 is a front plan view of a passenger side headlight assembly.

As shown, the first and second loops 120, 122 are received within corresponding attributes or channels 128, 130 formed in the lens of each headlight assembly 124, 126. Thus, the channel 128 in the first headlight assembly 124 corresponds to the respective first loop 120 and the channel 130 in the second headlight assembly 126 is a mirror image of the channel 128 and corresponds with the second loop 122. In the described embodiment, the first and second loops 120, 122 are secured in position within the corresponding lens channels 128, 130 by spring clips 132 as shown in FIG. 13. The spring clips 132 are attached to tabs 133 formed in the channels 128, 130 and further provide support for the grille 116 during the assembly process. In addition to the various attributes of the grille 116 and the headlight assemblies 124, 126 which establish consistent margins or gap widths between the components, the spring clips provide further assistance in ensuring consistent margins or gap widths between the first and second loops 120, 122 and their corresponding channels 128, 130. Of course, the grille extensions may be secured adjacent the headlight assemblies in any manner or not at all in alternate embodiments.

As generally described above and best shown in FIG. 14, the grille 116 acts as a fixture during assembly for properly aligning the headlight assemblies 62 relative the grille. In the described embodiment, grille guide pins 134 and 136 are generally positioned for engaging corresponding apertures 138 and 140 of the passenger side headlight assembly 124.

The location of apertures 138 and 140 on the passenger side headlight subassembly 124 is best shown in FIG. 13. These grille and headlight assembly attributes work together as described below to establish consistent margins or gap widths between the components, and to restrict movement of the resulting subassembly 118 in one or more directions.

Returning to FIG. 14, the headlight assembly 124 apertures 138, 140 receive the grille guide pins 134, 136. The guide pins 134, 136 are star pins having tapered heads which accommodate locating of the apertures 138, 140 during assembly. The first aperture 138 in the described embodiment includes a countersunk portion 142 designed to receive the pin 136 during installation and to guide or funnel it into a non-countersunk portion or hole 144.

As further shown, the countersunk portion 142 is formed in the lens 68 of the headlight assembly 62 and extends a distance from a surface of the lens. A width or major diameter 146 of the extended countersunk portion 142 meets specific design tolerances (e.g., +0.5 mm) such that the grille guide pin 134 is aligned within the major diameter 146 during assembly. As the pin 134 enters and engages the extended countersunk portion 142 as shown by action arrow B, the countersunk portion guides or funnels the pin (shown in dashed line and labeled 134') into the hole 144 which is sized to receive the pin (shown in dashed line and labeled 134") and prevent movement of the grille along the Y-axis and the Z-axis relative the headlight assembly 124.

The hole 144 is formed in both the lens 68 and the housing 64 of the headlight assembly 124 in the described embodiment, and aligns the headlight assembly with the grille 116. In other embodiments, the hole may be formed in only the housing or the aperture may be formed solely in the lens. In each embodiment, the hole 144 acts as a 4-way locator preventing movement in four different directions along the Y-axis and the Z-axis. In other words, the hole 144 serves as a Y-axis locator and a Z-axis locator to restrict movement and accommodate positioning of the headlight assembly 124 relative the grille 116 to establish a consistent margin or gap width therebetween.

Figure 14:
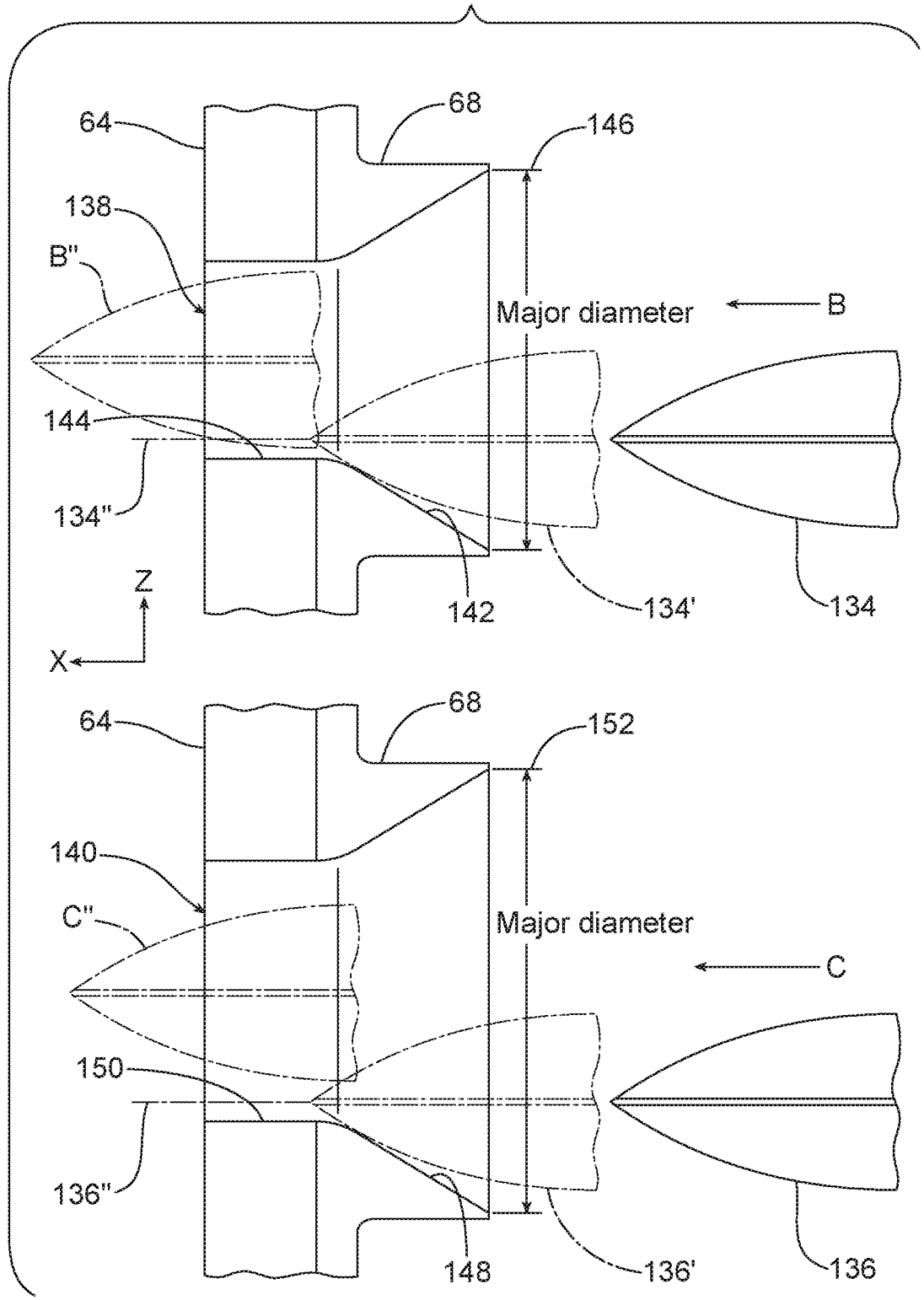
FIG. 14 is a cross sectional view of the passenger side headlight assembly including apertures for receiving grille guide pins.

The second aperture 140 similarly includes a tapering portion 148 designed to receive the pin 136 and guide it into an un-tapered portion or slot 150. As shown in FIG. 14, the tapered portion 148 is formed in the lens 68 of the headlight assembly 124 and extends a distance from a surface of the lens. An outer cross section 152 of the extended tapered portion 148 meets specific design tolerances (e.g., +0.5 mm) such that the grille guide pin 136 is aligned within the outer cross section 152 during assembly. As the pin 136 enters and engages the extended tapered portion 148 as shown by action arrow C, the tapered portion guides or funnels the pin (shown in dashed line and labeled 136') into the slot 150 which is sized to receive the pin (shown in dashed line and labeled 136") and prevent movement of the grille 116 along the Y-axis relative the headlight assembly 124 (e.g., into and out of the drawing figure) while accommodating limited movement along the Z-axis (e.g., up and down in the drawing figure).

Again, the slot 150 is formed in both the lens 68 and the housing 64 of the headlight assembly 124 in the described embodiment, and aligns the headlight assembly with the grille 116. In other embodiments, the slot may be formed in only the housing or the aperture may be formed solely in the lens. In any embodiment, the slot 150 acts as a 2-way locator preventing movement in two different directions along the Y-axis. In other words, the slot 150 serves as a Y-axis locator to restrict movement and accommodate positioning of the headlight assembly 62 relative the grille 116 to establish a consistent margin or gap width therebetween.

In the described embodiment, the grille 116 includes additional attributes in the form of grille guide pins for engaging the driver side headlight assembly 124. As indicated above, the passenger side and the driver side headlight assemblies 124 and 126 are mirror images of one another. Accordingly, the additional grille pins engage attributes of the driver side headlight assembly 126 in the same manner described above to establish consistent margins or gap widths between the components. While the four grille pins are located generally in each of the corners of the grille 116 in the described embodiment, alternate embodiments could position the grille pins elsewhere on the grille and the corresponding apertures elsewhere on the headlight assemblies 62. Even more, additional grille pins, or even fewer grille pins and corresponding apertures could be utilized.

Figure 15:
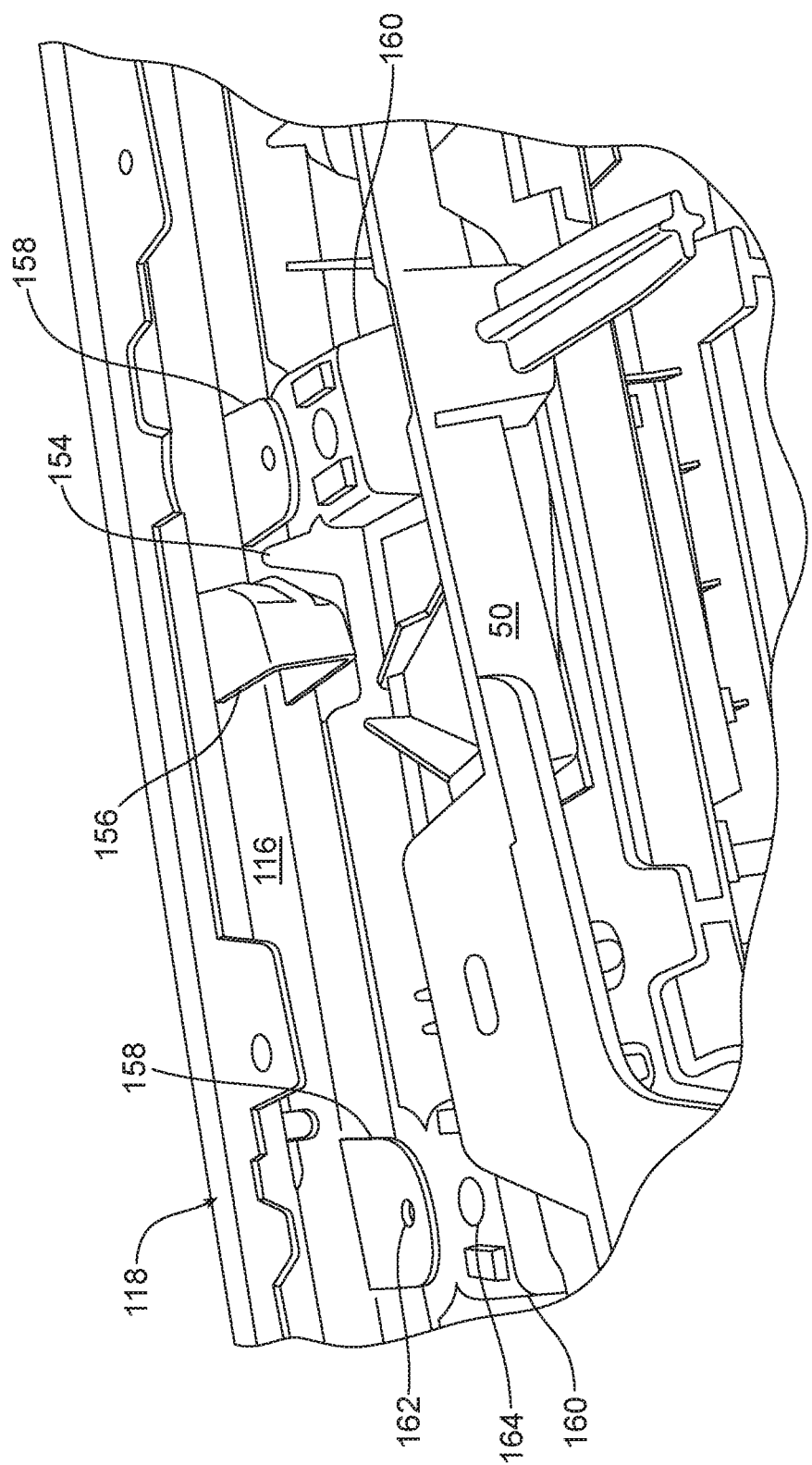
FIG. 15 is a top plan view of the active grille shutters housing with the grille and headlight assemblies shown in exploded view.

While the apertures 138, 140 in the headlight assembly 124 serve as guides for the grille pins 134, 136 and relative locators for the grille 116 and headlight assembly, attributes formed on the AGS housing 50 provide further guidance for aligning the grille during assembly. As shown in FIG. 15, the AGS housing 50 includes guides 154 that engage corresponding guide wedges or deflectors 156 on the grille 116 during assembly. Contact between the guide surfaces 154 and deflectors 156 guides or directs the grille/headlights subassembly 118 toward a central position where an additional grille attribute engages the cooling module assembly 44.

In this central position, a plurality of alignment tabs 158 on the grille 116 are generally aligned with a corresponding plurality of receivers 160 on the AGS housing 50. As shown, apertures 162 in the grille alignment tabs 158 are larger than mating apertures 164 on the AGS housing 50 to accommodate certain tolerances. In the described embodiment, the deflectors 156 and the alignment tabs 158 are integrally formed with the grille 116 and the guide surfaces 154 and receivers 160 are integrally formed with the AGS housing 50. Again, additional guide surfaces, deflectors, alignment tabs, and/or receivers, or even fewer, if any, could be utilized in alternate embodiments.

In the described embodiment, the grille 116 is designed to engage the headlight assemblies 124, 126 and then be guided toward the central position prior to engaging the cooling module assembly 44. This order of engagement is accomplished through grille design shape, headlight assembly design shape including the extended countersunk and/or tapered apertures 142 and 148, and by appropriately selecting grille pin lengths such that the extended countersunk and/or tapered apertures of the headlight assemblies 62 are engaged before the subassembly 118 is directed toward the central position and engages the AGS housing 50. Of course, alternate embodiments may utilize more or fewer steps and may differ the order of engagement of components.

Figure 16:
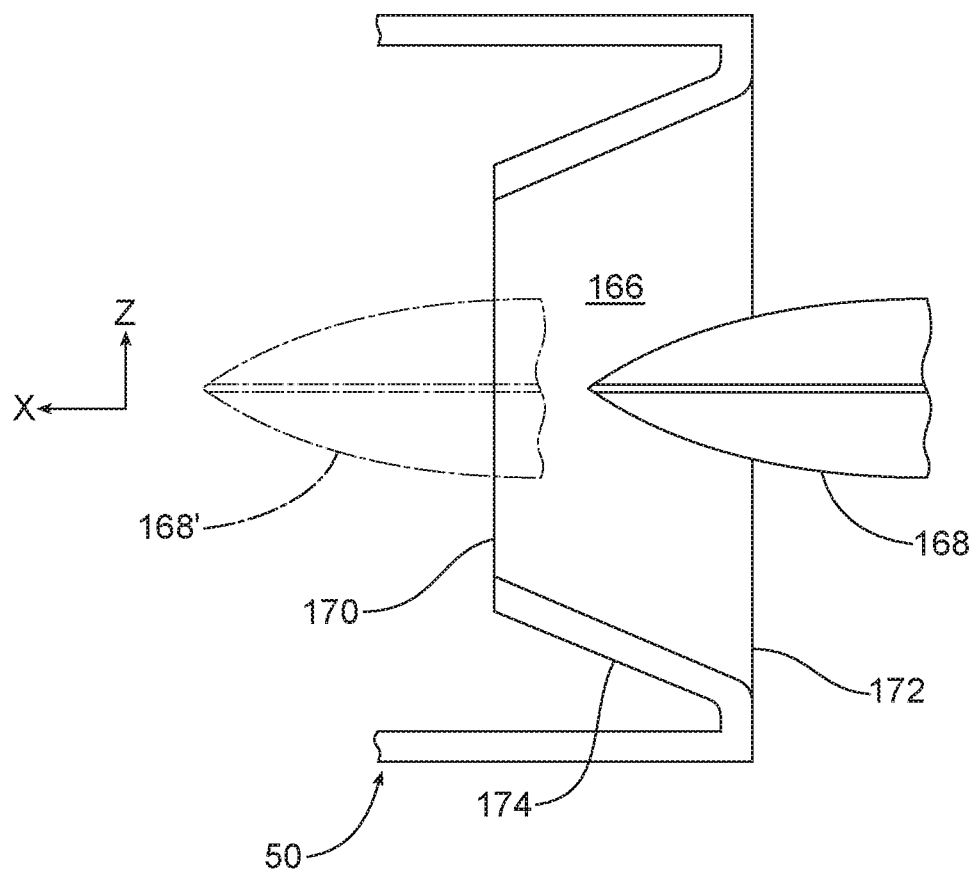
FIG. 16 is a cross sectional view of the active grille shutters housing including an aperture for receiving a grille guide pins.

As best shown in FIG. 11, the AGS housing 50 includes an aperture 166 designed to receive a grille guide pin 168. The guide pin 168, as shown in FIG. 16, is a star pin having a tapered head which accommodates locating of the aperture 166 during assembly. The aperture 166 in the described embodiment is a slot 170 that receives the pin 168 and guides it into the slot. An outer cross section 172 formed in the AGS housing 50 meets specific design tolerances (e.g., +0.5 mm) such that the pin 168 should align within the outer cross-section. As the pin 168 engages the slot 170, tapering walls 174 guide the pin, as needed, into the slot which is sized to receive the pin (shown in dashed line and labeled 168') and prevent movement along the Y-axis while accommodating limited movement along the Z-axis as shown. More specifically, the aperture 166 is used as a Y-axis locator to restrict movement and accommodate positioning of the subassembly 118 relative the AGS housing 50.

As suggested, the engagement of the cooling module assembly 44 restricts movement of the second skin component, i.e., the grille 116, relative the at least one non-skin component, i.e., the cooling module assembly 44. In the described embodiment, the cooling module assembly 44 is engaged by the grille 116 such that movement of the grille and the headlight assemblies, i.e., the skin component subassembly 118, is restricted in the Y-axis direction. This effectively centers the grille 116 on the cooling module assembly 44 and freezes the skin component subassembly 118, including the grille and headlight assemblies 124, 126, in position relative the cooling module assembly 44. Once the loosely supported subassembly 118 is centered, the subassembly including the grille 116 and the headlight assemblies 124, 126 are fixed to the front end of the vehicle 12.

Fixing the subassembly 118 to the vehicle front end 12 involves several fasteners in the described embodiment. The fasteners are used to attach the subassembly 118 to varying front end components at the X-plane locators. As shown in FIG. 7, for example, the first surface 104 of the AGS housing 50 acts as an X-axis locator and includes an aperture 103 through which a fastener extends. A ninety-degree air gun is utilized to secure the fastener in position and the grille 116 and headlight housing 64 to the AGS housing 50. Similarly, the headlight assembly 124 is secured to the AGS housing 50 using a second aperture 176 in the strap 88 (shown in FIG. 7). A fastener 178, shown in FIG. 9, is used to secure a lower portion of the headlight assembly 124 to the fender 26 adjacent the fish mouth Z-locator 108. Even more, fasteners are used to attach the grille 116 to the AGS housing 50 utilizing aperture 162. As described above, apertures 162 in alignment tabs 158 positioned along an upper portion of the grille 116 are aligned with mating apertures 164 in corresponding receivers 160 during the assembly process and fasteners are used to secure the grille 116 and AGS housing 50 together at this point of the assembly process. Of course, additional or fewer fasteners may be utilized to secure the subassembly 118 to the vehicle front end 12.

Figure 17:
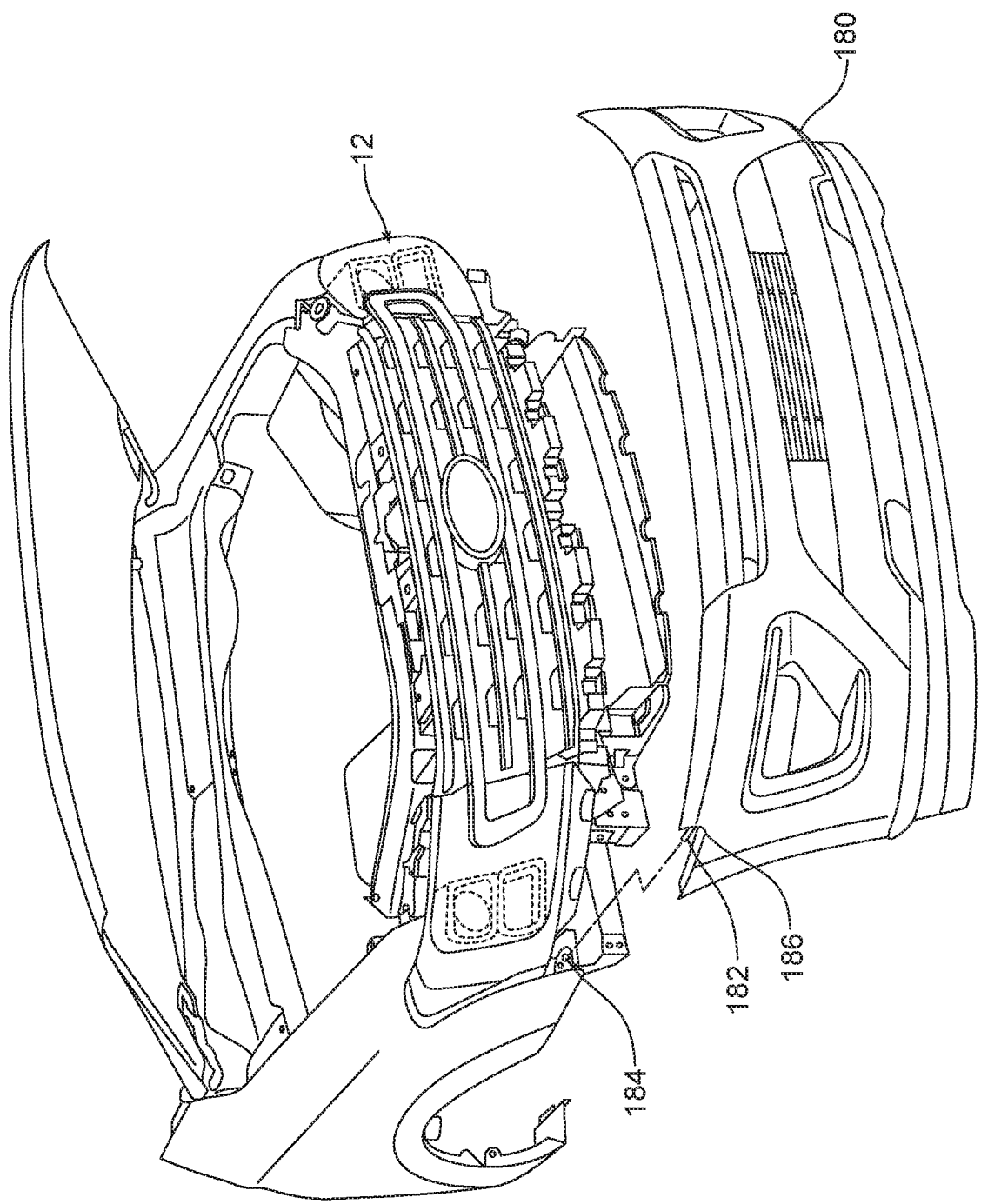
FIG. 17 is a perspective view of a front end of a vehicle with a facia shown in exploded view.

Once the subassembly is secured, a facia 180 is attached to the vehicle front end 12 as shown in FIG. 17. Similar to the other skin components, the facia 180 includes attributes that restrict movement in one or more directions and help align the facia during assembly. In the described embodiment, a first attribute, which is a first pin 182, engages an attribute in the fender 26 (best shown in FIG. 5). The fender attribute is an aperture 184 that acts as a 4-way locator limiting movement in four different directions along the Y-axis and the Z-axis. In other words, the aperture 184 serves as a Y-axis locator and a Z-axis locator. A second attribute, or facia pin, engages an aperture in the driver side fender in the same manner described above with regard to the passenger side fender.

Figure 18:
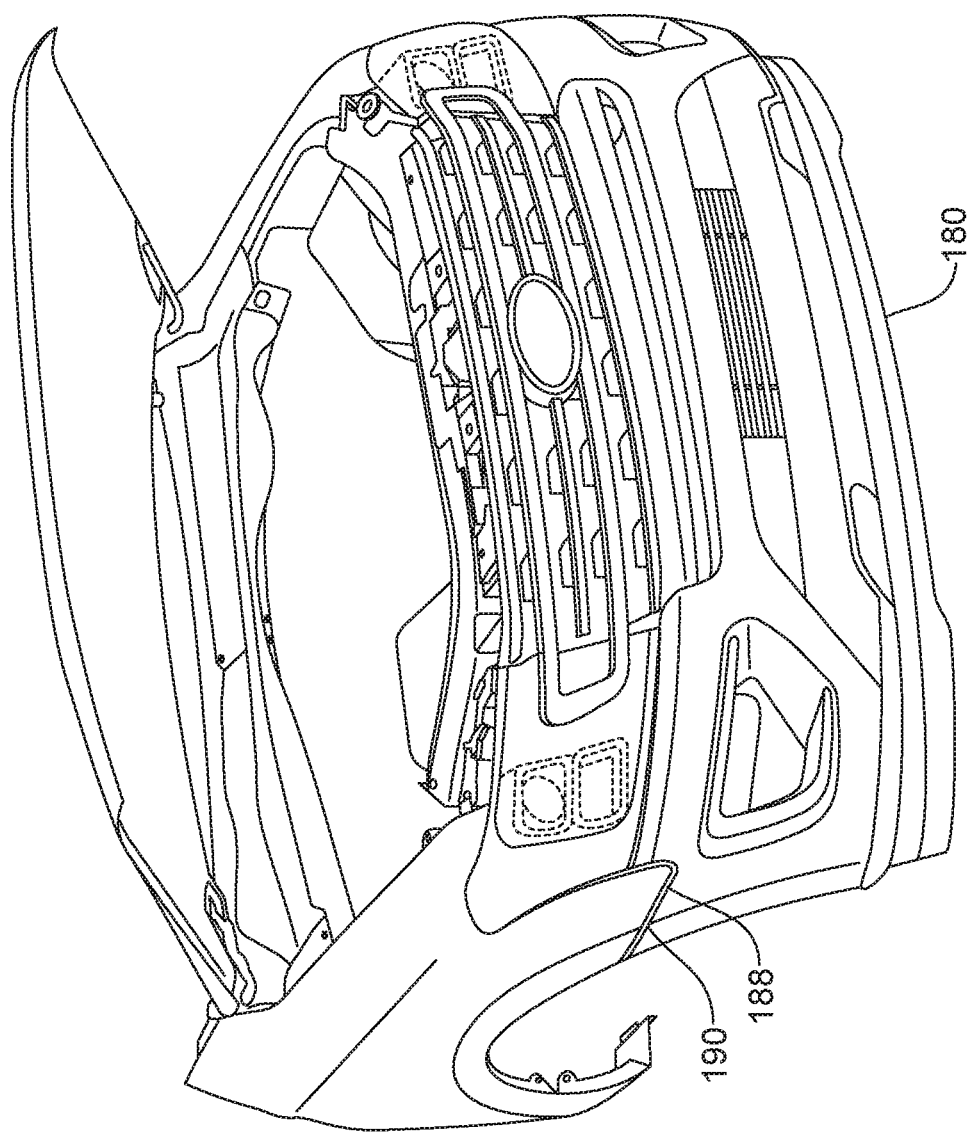
FIG. 18 is a perspective view of an assembled front end of a vehicle.

In the described embodiment, the facia pin 182 is located on a side wall 186 of a notch formed in the facia. The side wall 186 generally faces the fender 26 during assembly and helps align a first upper edge 188 of the facia with a lower edge 190 of the fender 26 as shown in FIG. 18. In this manner, the fender 26 and facia 180 are coupled together in a manner that establishes a consistent margin or gap width therebetween. Of course, alternate embodiments could position the facia pins elsewhere on the facia and the corresponding apertures elsewhere on the fenders 26 with the same result and additional fasteners may be utilized to secure the facia 180 to the vehicle front end 12.

As shown in FIG. 19, the lens 68 of the headlight assembly 124 is used as a facia locating feature in order to align the facia 180 with the headlight assembly. More specifically, the lens 68 is molded in the described embodiment with a channel 192 along a lower edge 194 for receiving an upper edge 196 of the facia 180 and limiting its movement in the Z-axis direction. In other words, the channel 192 is another headlight assembly attribute which serves as a Z-axis locator. Within the channel 192, a catcher bracket 198 is designed to guide the facia upper edge 196 into the channel during assembly in order to establish proper position of the facia 180 relative the headlight assembly 124, and necessarily the grille 118. In this manner, the facia 180 and headlight assembly 124 are coupled together in a manner that establishes a consistent margin or gap width therebetween. Given the relationship between the headlight assemblies 124, 126 and the grille 118, a consistent margin or gap width is also established between the facia 180 and the grille.

In summary, numerous benefits result from the methods of assembling vehicle front end components to a vehicle body. The described methods are applicable to any type of vehicle and body construction and enable allow for superior craftsmanship, advanced and aggressive appearance and uncommon or previously-unobtainable styling improvements, ease of assembly, reduction of installation time and number of attachments, localized relationships of front end components and subassemblies to adjacent systems, components, and subassemblies and/or improved customer satisfaction all without the limitations associated with conventional vehicle front end design and construction or modular design.

Even more, the vehicle front end assembly methods necessitate a further need for complimentary improvements in vehicle front end component designs and subassemblies of such components. Individual front end components, including headlight assemblies, and/or subassemblies, including the grille and headlight assemblies, should incorporate combinations of hands-free, anti-rotation, sliding or slide-capable, and other assembly-aiding elements which would not be required for conventional and/or modular vehicle assembly. Such elements are integral in the component designs in order to reduce or avoid costly assembly tooling and should allow for improved craftsmanship and attributes such as aggressive appearance and uncommon or previously-unobtainable styling improvements including overlapping component designs.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A headlight assembly for a motor vehicle, comprising:
a housing including a plurality of attributes engaging with a fender and a cooling module of said motor vehicle;
a lens carried on said housing, said lens including an additional attribute engaging with a grille of said motor vehicle, said additional attribute including a channel, provided in a front face of said lens, that receives an extension of the grille wherein said extension is a loop nesting in said channel;
a tab carried on said lens in said channel; and a spring clip engaging said tab and securing said loop in a nested position within said channel.

2. The headlight assembly of claim 1, wherein said plurality of attributes include a snap stud.

3. The headlight assembly of claim 2, wherein said plurality of attributes include a strap.

4. The headlight assembly of claim 3, wherein said plurality of attributes include a guide pin.

5. The headlight assembly of claim 4, wherein said plurality of attributes include a pin.

6. The headlight assembly of claim 5, wherein said snap stud engages with a lug on said fender and said pin engages in an opening carried on said fender.

7. The headlight assembly of claim 6, wherein said guide pin engages in a slot formed on said cooling module.

8. The headlight assembly of claim 7, wherein said strap engages a receiver integrally formed as a part of said cooling module.

\* \* \* \* \*